United States Patent
Li et al.

(10) Patent No.: US 12,225,618 B2
(45) Date of Patent: Feb. 11, 2025

(54) DIRECTIONAL SIDELINK DISCONTINUOUS RECEPTION AND OPERATIONS

(71) Applicant: QUALCOMM Incorporated, San Diego, CA (US)

(72) Inventors: Qing Li, Princeton Junction, NJ (US); Hong Cheng, Basking Ridge, NJ (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 17/586,686

(22) Filed: Jan. 27, 2022

(65) Prior Publication Data
US 2022/0287142 A1 Sep. 8, 2022

Related U.S. Application Data

(60) Provisional application No. 63/157,562, filed on Mar. 5, 2021.

(51) Int. Cl.
*H04W 76/28* (2018.01)
*H04L 1/00* (2006.01)
(Continued)

(52) U.S. Cl.
CPC ........... *H04W 76/28* (2018.02); *H04L 1/0025* (2013.01); *H04W 24/10* (2013.01); *H04W 92/18* (2013.01)

(58) Field of Classification Search
CPC ..... H04W 76/28; H04W 24/10; H04W 92/18; H04W 76/14; H04W 76/38; H04L 1/0025; H04L 5/0055; H04L 1/0026; H04L 1/1848; H04L 1/1851; H04L 1/188; H04L 5/0053; H04L 5/0078; H04L 5/14; H04L 1/0027
See application file for complete search history.

(56) References Cited

U.S. PATENT DOCUMENTS

2016/0374142 A1* 12/2016 Kato ............... H04W 76/28
2018/0213560 A1* 7/2018 Naghshvar ........ H04W 74/0808
(Continued)

OTHER PUBLICATIONS

3GPP TSG-RAN WG2 Meeting #113 electronic E-Meeting, Jan. 25-Feb. 5, 2021, R2-2100796, Vivo, DRX Alignment between TX and RX UEs (hereinafter as Vivo_ R2-2100796) (Year: 2021).*
(Continued)

*Primary Examiner* — Walli Z Butt
*Assistant Examiner* — Thad N Defauw
(74) *Attorney, Agent, or Firm* — Holland & Hart LLP

(57) ABSTRACT

Methods, systems, and devices for wireless communications are described. A base station may configure one or more user equipments (UEs) with one or more timers, such that the UEs may switch directions for a communication mode for the duration of a timer and during a discontinuous cycle. The UEs may activate the timers and may perform the switching operation during the active duration of a discontinuous cycle. A UE may transmit a sidelink message during a transmission on duration (TX-On). The UE may activate a timer and switch to a receive mode. Similarly, the second UE may receive the sidelink message during a reception on duration (RX-On) and may activate the timer. The second UE may switch to a TX-On mode for an on duration of a TX-On cycle to transmit a sidelink response.

30 Claims, 16 Drawing Sheets

(51) Int. Cl.
*H04W 24/10* (2009.01)
*H04W 92/18* (2009.01)

(56) References Cited

U.S. PATENT DOCUMENTS

| | | | | |
|---|---|---|---|---|
| 2019/0053162 | A1* | 2/2019 | Islam | H04W 52/0229 |
| 2021/0059005 | A1 | 2/2021 | Hosseini et al. | |
| 2022/0077993 | A1* | 3/2022 | Hong | H04L 5/0048 |
| 2023/0014303 | A1* | 1/2023 | Di Girolamo | H04W 72/20 |
| 2023/0092370 | A1* | 3/2023 | Zhao | H04L 1/1864 |
| | | | | 370/235 |

OTHER PUBLICATIONS

Apple: "Discussion on Sidelink DRX", 3GPP Draft, R2-2009527, 3GPP TSG-RAN WG2 Meeting #112e, 3rd Generation Partnership Project (3GPP), Mobile Competence Centre, 650, Route Des Lucioles, F-06921, Sophia-Antipolis Cedex, France, vol. RAN WG2, No. Online, 20201102-20201113, Oct. 23, 2020 (Oct. 23, 2020), XP051942479, pp. 1-5, Retrieved from the Internet: URL:https://ftp.3gpp.org/tsg_ran/WG2_RL2/TSGR2_112-e/Docs/R2-2009527.zip [retrieved on Oct. 23, 2020] the whole document.

International Search Report and Written Opinion—PCT/US2022/014361—ISA/EPO—May 2, 2022.

OPPO: "Discussion on DRX for sidelink", 3GPP Draft, R2-2008772, 3GPP TSG-RAN WG2 #112-e, 3rd Generation Partnership Project (3GPP), Mobile Competence Centre, 650, Route Des Lucioles, F-06921, Sophia-Antipolis Cedex, France, vol. RAN WG2, No. E-meeting, 20201101, Oct. 23, 2020 (Oct. 23, 2020), XP051941878, 7 Pages, Retrieved from the Internet: URL:https://ftp.3gpp.org/tsg_ran/WG2_RL2/TSGR2_112-e/Docs/R2-2008772.zip [retrieved on Oct. 23, 2020] the whole document.

Vivo: "DRX Alignment Between TX and RX UEs", 3GPP Draft, R2-2100796, 3GPP TSG-RAN WG2 Meeting #113 electronic, 3rd Generation Partnership Project (3GPP), Mobile Competence Centre, 650, Route Des Lucioles, F-06921, Sophia-Antipolis Cedex, France, vol. RAN WG2, No. electronic, 20210125-20210205, Jan. 15, 2021 (Jan. 15, 2021), XP051973903, 6 Pages, Retrieved from the Internet: URL: https://ftp.3gpp.org/tsg_ran/WG2_RL2/TSGR2_113-e/Docs/R2-2100796.zip, R2-2100796 DRX Alignment between TX and RX UEs.doc [retrieved on Jan. 15, 2021] chapters 1-3, the whole document.

* cited by examiner

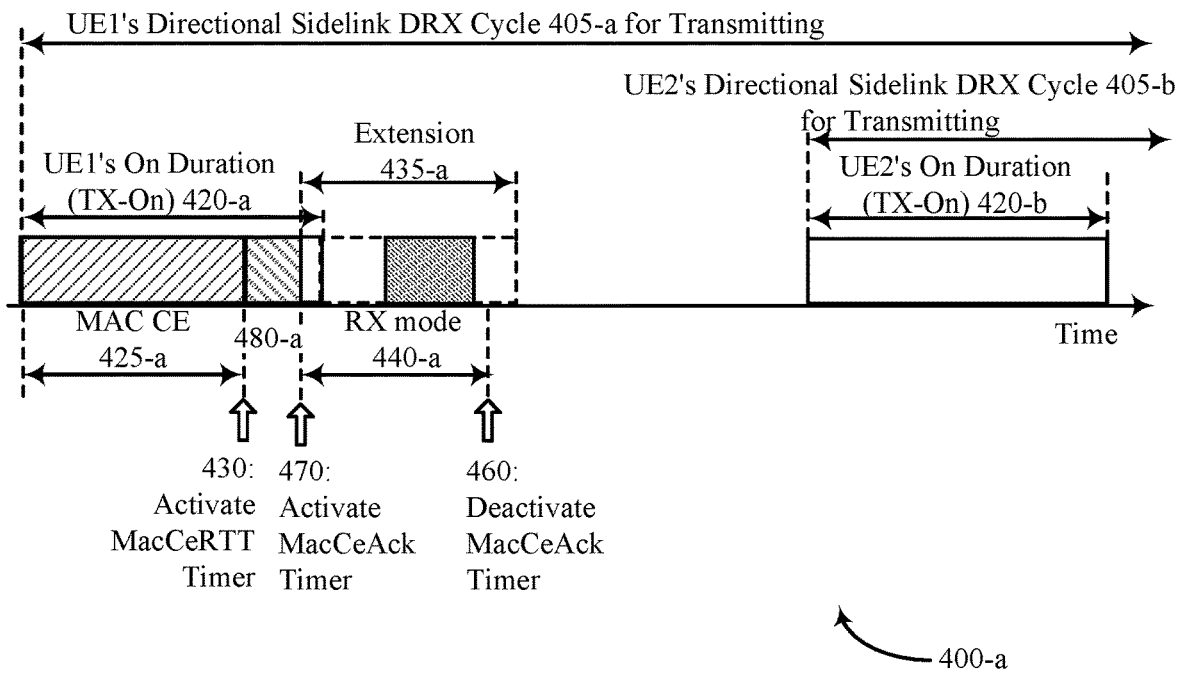
FIG. 4A
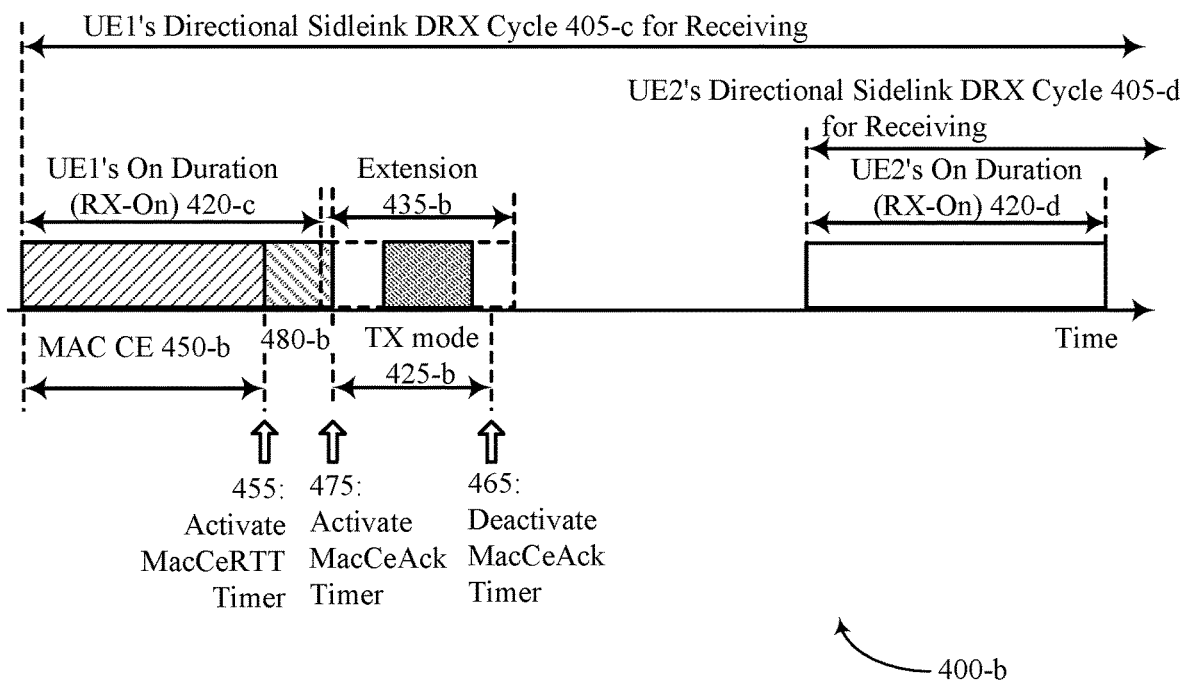
FIG. 4B
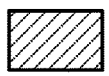 MAC-CE Message 410        Feedback Message 415
 Process MAC CE and/or switch to Ack 480-a, 480-b

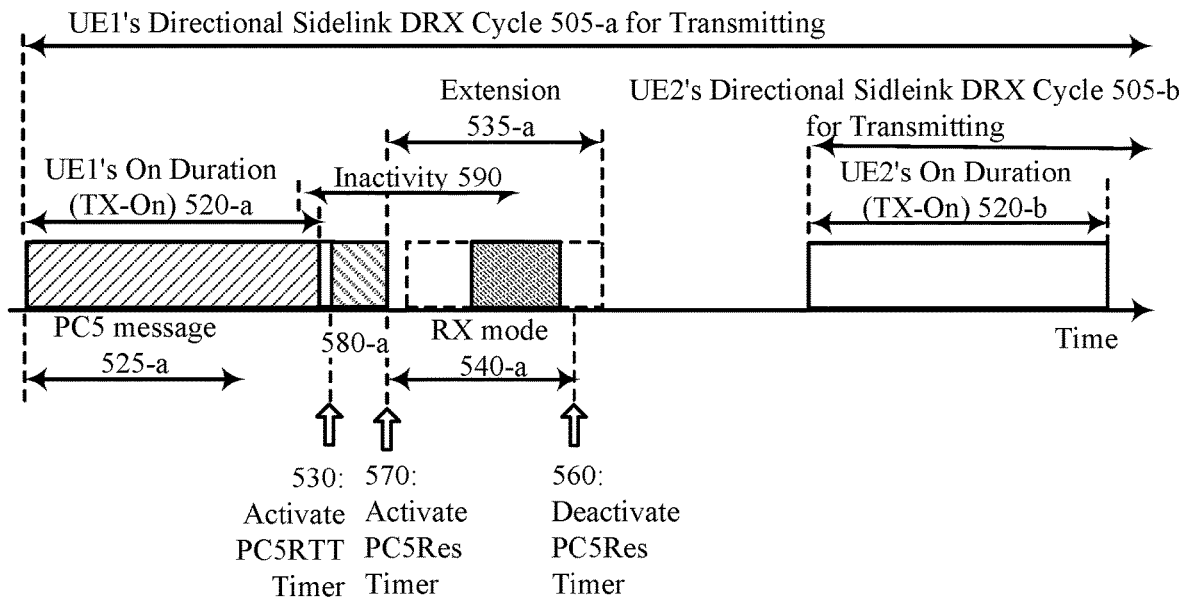
FIG. 5A
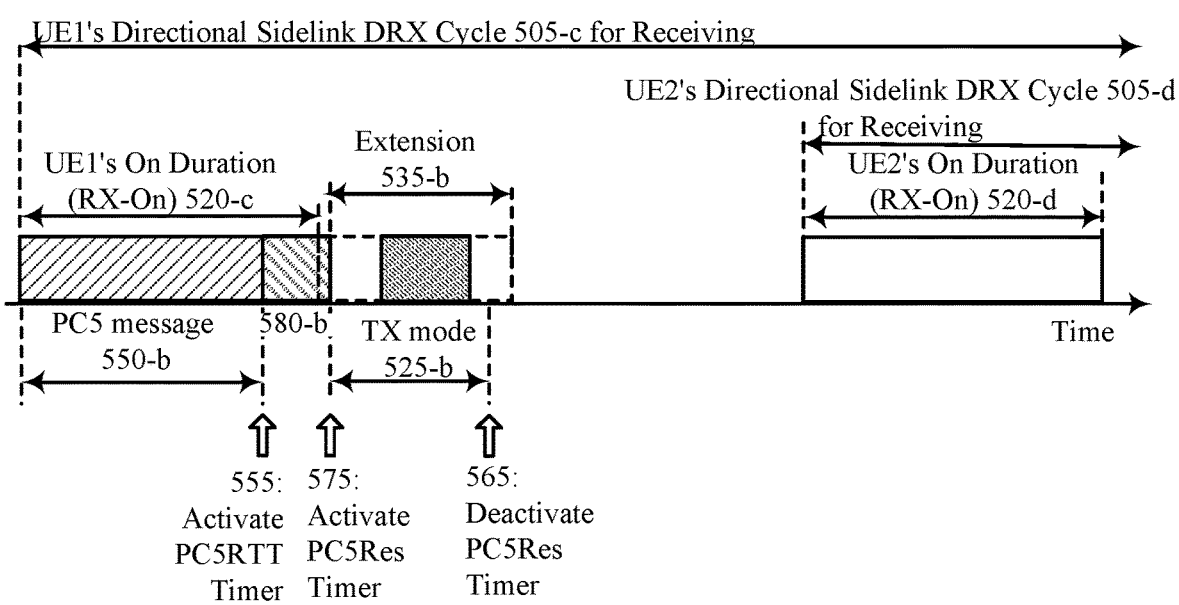
FIG. 5B
 PC5 Message 510
 Feedback Message 515
 Process PC5 RRC and/or switch to response 580-a, 580-b

DIRECTIONAL SIDELINK DISCONTINUOUS RECEPTION AND OPERATIONS

CROSS REFERENCE

The present application for patent claims the benefit of U.S. Provisional Patent Application No. 63/157,562 by LI et al., entitled "DIRECTIONAL SIDELINK DISCONTINUOUS RECEPTION AND OPERATIONS," filed Mar. 5, 2021, assigned to the assignee hereof, and expressly incorporated by reference herein.

FIELD OF TECHNOLOGY

The following relates to wireless communications, including directional sidelink discontinuous reception (DRX) and operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support directional sidelink discontinuous reception (DRX) and operations. Generally, the described techniques provide for a base station to configure one or more user equipments (UEs) with a timer, such that the UEs may switch directions for a communication mode for the duration of the timer and during a directional DRX cycle. In some examples, a timer configuration may include a timer for starting a discontinuous cycle, a timer for switching the direction of a communication mode, or both. If the timer configuration includes the timer for switching the direction of a communication mode, the UEs may perform the switching operation during the active duration of a directional DRX. For example, a UE may transmit a sidelink message during a transmission on (TX-On) duration of a directional DRX cycle. In some examples, rather than waiting for the TX-On duration to end and then entering a reception on (RX-On) duration, to a reception mode (RX mode), the UE may activate the timer after transmitting the sidelink message and may switch to a RX mode for a TX-On duration of a directional DRX cycle. Similarly, the second UE may receive the sidelink message during a RX-On duration of a directional DRX cycle and may activate the timer to switch to a transmission mode (TX mode) for an RX-On duration of a directional DRX cycle to transmit a sidelink response.

A method for wireless communications at a first UE is described. The method may include receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, transmitting, within the active duration of the discontinuous cycle, a sidelink control message or sidelink measurement signal to a second UE, activating the first timer after transmitting the sidelink control message or sidelink measurement signal based on the configuration, switching from a TX mode to a RX mode based on activating the first timer, activating the second timer to extend the active duration of the discontinuous cycle based on expiration of the first timer, and monitoring, after switching from the TX mode to the RX mode, for a sidelink response to the sidelink control message or sidelink measurement signal from the second UE during an extension period of the active duration based on activating the second timer and in accordance with the configuration.

An apparatus for wireless communications at a first UE is described. The apparatus may include a processor, memory coupled with the processor, and instructions stored in the memory. The instructions may be executable by the processor to cause the apparatus to receive a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, transmit, within the active duration of the discontinuous cycle, a sidelink control message or sidelink measurement signal to a second UE, activate the first timer after transmitting the sidelink control message or sidelink measurement signal based on the configuration, switch from a TX mode to a RX mode based on activating the first timer, activate the second timer to extend the active duration of the discontinuous cycle based on expiration of the first timer, and monitor, after switching from the TX mode to the RX mode, for a sidelink response to the sidelink control message or sidelink measurement signal from the second UE during an extension period of the active duration based on activating the second timer and in accordance with the configuration.

Another apparatus for wireless communications at a first UE is described. The apparatus may include means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, means for transmitting, within the active duration of the discontinuous cycle, a sidelink control message or sidelink measurement signal to a second UE, means for activating the first timer after transmitting the sidelink control message or sidelink measurement signal based on the configuration, means for switching from a TX mode to a RX mode based on activating the first timer, means for activating the second timer to extend the active duration of the discontinuous cycle based on expiration of the first timer, and means for monitoring, after switching from the TX mode to the RX mode, for a sidelink response to the sidelink control message or sidelink measurement signal from the second UE during an extension period of the active duration based on activating the second timer and in accordance with the configuration.

A non-transitory computer-readable medium storing code for wireless communications at a first UE is described. The code may include instructions executable by a processor to receive a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, transmit, within the active duration of the discontinuous cycle, a sidelink control message or sidelink measurement signal to a second UE, activate the first timer after transmitting the sidelink control message or sidelink measurement signal based on the configuration, switch from a TX mode to a RX mode based on activating the first timer, activate the second timer to extend the active duration of the discontinuous cycle based on expiration of the first timer, and monitor, after switching from the TX mode to the RX mode, for a sidelink response to the sidelink control message or sidelink measurement signal from the second UE during an extension period of the active duration based on activating the second timer and in accordance with the configuration.

Some examples of the method, apparatuses, and non-transitory computer-readable medium described herein may further include operations, features, means, or instructions for receiving, within the extension period, a feedback message indicating the sidelink control message was received successfully and deactivating the second timer after receiving the feedback message.

Some examples of the method, apparatuses, and non-transitory computer-readable medium described herein may further include operations, features, means, or instructions for receiving, within the extension period, a feedback message indicating the sidelink message was received unsuccessfully.

Some examples of the method, apparatuses, and non-transitory computer-readable medium described herein may further include operations, features, means, or instructions for performing a reset operation of the second timer based on unsuccessfully receiving the sidelink response.

Some examples of the method, apparatuses, and non-transitory computer-readable medium described herein may further include operations, features, means, or instructions for activating the first timer for switching to the TX mode for retransmission based on unsuccessfully receiving the sidelink response.

In some examples of the method, apparatuses, and non-transitory computer-readable medium described herein, the sidelink measurement signal includes one or more reference signals for a channel measurement and the method, apparatuses, and non-transitory computer-readable medium may include further operations, features, means, or instructions for receiving, in response to the one or more reference signals and during the extension period of the active duration, a report including information corresponding to the channel measurement.

In some examples of the method, apparatuses, and non-transitory computer-readable medium described herein, the one or more reference signals include a channel state information reference signal and the channel measurement includes a channel state information measurement.

In some examples of the method, apparatuses, and non-transitory computer-readable medium described herein, the sidelink control message may be a medium access control (MAC) control element (MAC-CE) and includes a MAC-CE timer.

In some examples of the method, apparatuses, and non-transitory computer-readable medium described herein, the sidelink control message may be a PC5 control message and includes a radio resource control (RRC) timer or a PC5 sidelink timer.

In some examples of the method, apparatuses, and non-transitory computer-readable medium described herein, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

In some examples of the method, apparatuses, and non-transitory computer-readable medium described herein, the configuration may be based on a quality of service for the sidelink communications, a packet delay budget for the sidelink communications, a reliability parameter, a priority of the control message, or a combination thereof.

A method for wireless communications at a first UE is described. The method may include receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, receiving, within the active duration of the discontinuous cycle, a sidelink control message or sidelink measurement signal from a second UE, activating the first timer after receiving the sidelink message or sidelink measurement signal based on the configuration, switching from a RX mode to a TX mode based on activating the first timer, activating the second timer to extend the active duration of the discontinuous cycle based on expiration of the first timer, and transmitting, after switching from the RX mode to the TX mode, a sidelink response to the sidelink control message or sidelink measurement signal during an extension period of the active duration based on activating the second timer and in accordance with the configuration.

An apparatus for wireless communications at a first UE is described. The apparatus may include a processor, memory coupled with the processor, and instructions stored in the memory. The instructions may be executable by the processor to cause the apparatus to receive a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, receive, within the active duration of the discontinuous cycle, a sidelink control message or sidelink measurement signal from a second UE, activate the first timer after receiving the sidelink message or sidelink measurement signal based on the configuration, switch from a RX mode to a TX mode based on activating the first timer, activate the second timer to extend the active duration of the discontinuous cycle based on expiration of the first timer, and transmit, after switching from the RX mode to the TX mode, a sidelink response to the sidelink control message or sidelink measurement signal during an extension period of the active duration based on activating the second timer and in accordance with the configuration.

Another apparatus for wireless communications at a first UE is described. The apparatus may include means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, means for receiving, within the active duration of the discontinuous cycle, a sidelink control message or sidelink measurement signal from a second UE, means for activating the first timer after receiving the sidelink message or sidelink measurement signal based on the configuration, means for switching from a RX mode to a TX mode based on activating the first timer, means for activating the second timer to extend the active duration of the discontinuous cycle based on expiration of the first timer, and means for transmitting, after switching from the RX mode to the TX mode, a sidelink response to the sidelink control message or sidelink measurement signal during an extension period of the active duration based on activating the second timer and in accordance with the configuration.

A non-transitory computer-readable medium storing code for wireless communications at a first UE is described. The code may include instructions executable by a processor to receive a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE, receive, within the active duration of the discontinuous cycle, a sidelink control message or sidelink measurement signal from a second UE, activate the first timer after receiving the sidelink message or sidelink measurement signal based on the configuration, switch from a RX mode to a TX mode based on activating the first timer, activate the second timer to extend the active duration of the discontinuous cycle based on expiration of the first timer, and transmit, after switching from the RX mode to the TX mode, a sidelink response to the sidelink control message or sidelink measurement signal during an extension period of the active duration based on activating the second timer and in accordance with the configuration.

In some examples of the method, apparatuses, and non-transitory computer-readable medium described herein, transmitting the sidelink response may include operations, features, means, or instructions for transmitting, within the extension period, a feedback message indicating the sidelink control message was received successfully and deactivating the second timer after transmitting the feedback message.

In some examples of the method, apparatuses, and non-transitory computer-readable medium described herein, transmitting the sidelink response may include operations, features, means, or instructions for transmitting, within the extension period, a feedback message indicating the sidelink message was received unsuccessfully.

Some examples of the method, apparatuses, and non-transitory computer-readable medium described herein may further include operations, features, means, or instructions for performing a reset operation of the second timer based on transmitting the feedback message.

Some examples of the method, apparatuses, and non-transitory computer-readable medium described herein may further include operations, features, means, or instructions for activating the first timer for switching to the RX mode for retransmission based on unsuccessfully receiving the sidelink control message.

Some examples of the method, apparatuses, and non-transitory computer-readable medium described herein may further include operations, features, means, or instructions for receiving, within the active duration, the sidelink measurement signal, where the sidelink measurement signal includes one or more reference signals for a channel measurement, performing a set of channel measurements based on the one or more reference signals, and transmitting, during the extension period of the active duration, a report including information corresponding to the set of channel measurements.

In some examples of the method, apparatuses, and non-transitory computer-readable medium described herein, the one or more reference signals include a channel state information reference signal and the channel measurement includes a channel state information measurement.

In some examples of the method, apparatuses, and non-transitory computer-readable medium described herein, the sidelink control message may be a PC5 control message and includes an RRC timer or a PC5 sidelink timer.

In some examples of the method, apparatuses, and non-transitory computer-readable medium described herein, the sidelink control message may be a MAC-CE and includes a MAC-CE timer.

In some examples of the method, apparatuses, and non-transitory computer-readable medium described herein, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

In some examples of the method, apparatuses, and non-transitory computer-readable medium described herein, the configuration may be based on a quality of service for the sidelink communications, a packet delay budget for the sidelink communications, a reliability parameter, a priority of the control message, or a combination thereof.

A method for wireless communications at a first user equipment (UE) is described. The method may include receiving a configuration message that indicates at least a first active duration of a discontinuous cycle for a sidelink response associated with a configuration for the first UE to perform sidelink communication, transmitting, within a second active duration of the discontinuous cycle, a sidelink control message or sidelink measurement signal to a second UE, switching, within the second active duration of the discontinuous cycle, from a TX mode to a RX mode based on transmitting the sidelink control message or the sidelink measurement signal, and monitoring, after switching from the TX mode to the RX mode and within an extension period with the first active duration of the discontinuous cycle based on the configuration, for the sidelink response to the sidelink control message or the sidelink measurement signal from the second UE.

An apparatus for wireless communications at a first UE is described. The apparatus may include a processor, memory coupled with the processor, and instructions stored in the memory. The instructions may be executable by the processor to cause the apparatus to receive a configuration message that indicates at least a first active duration of a discontinuous cycle for a sidelink response associated with a configuration for the first UE to perform sidelink communication, transmit, within a second active duration of the discontinuous cycle, a sidelink control message or sidelink measurement signal to a second UE, switching, within the second active duration of the discontinuous cycle, from a TX mode to a RX mode base at least in part on transmitting the sidelink control message or the sidelink measurement signal, and monitor, after switching from the TX mode to the RX mode and within an extension period with the first active duration of the discontinuous cycle based on the configuration, for the sidelink response to the sidelink control message or the sidelink measurement signal from the second UE.

Another apparatus for wireless communications at a first UE is described. The apparatus may include means for receiving a configuration message that indicates at least a first active duration of a discontinuous cycle for a sidelink response associated with a configuration for the first UE to perform sidelink communication, means for transmitting, within a second active duration of the discontinuous cycle, a sidelink control message or sidelink measurement signal to a second UE, means for switching, within the second active duration of the discontinuous cycle, from a TX mode to a RX mode based on transmitting the sidelink control message or the sidelink measurement signal, and means for monitoring, after switching from the TX mode to the RX mode and within an extension period with the first active duration of the discontinuous cycle based on the configuration, for the sidelink response to the sidelink control message or the sidelink measurement signal from the second UE.

A non-transitory computer-readable medium storing code for wireless communications at a first UE is described. The code may include instructions executable by a processor to receive a configuration message that indicates at least a first active duration of a discontinuous cycle for a sidelink response associated with a configuration for the first UE to perform sidelink communication, transmit, within a second active duration of the discontinuous cycle, a sidelink control message or sidelink measurement signal to a second UE, switching, within the second active duration of the discontinuous cycle, from a TX mode to a RX mode base at least in part on transmitting the sidelink control message or the sidelink measurement signal, and monitor, after switching from the TX mode to the RX mode and within an extension period with the first active duration of the discontinuous cycle based on the configuration, for the sidelink response to the sidelink control message or the sidelink measurement signal from the second UE.

Some examples of the method, apparatuses, and non-transitory computer-readable medium described herein may further include operations, features, means, or instructions for activating a first timer after transmitting the sidelink control message or the sidelink measurement signal based on a timer configuration for the first timer and a second timer for the first UE, the first timer for switching communication direction on sidelink and the second timer for extending the first active duration of the discontinuous cycle for sidelink communications for the first UE, where the configuration message includes the configuration, and where the switching may be based on activating the first timer and activating the second timer to extend the first active duration of the discontinuous cycle based on expiration of the first timer, where the monitoring may be based on activating the second timer and may be in accordance with the configuration.

Some examples of the method, apparatuses, and non-transitory computer-readable medium described herein may further include operations, features, means, or instructions for receiving, within the extension period, a feedback message indicating the sidelink control message was received successfully and deactivating the second timer after receiving the feedback message.

Some examples of the method, apparatuses, and non-transitory computer-readable medium described herein may further include operations, features, means, or instructions for receiving, within the extension period, a feedback message indicating the sidelink control message was received unsuccessfully.

Some examples of the method, apparatuses, and non-transitory computer-readable medium described herein may further include operations, features, means, or instructions for performing a reset operation of the second timer based on unsuccessfully receiving the sidelink response.

Some examples of the method, apparatuses, and non-transitory computer-readable medium described herein may further include operations, features, means, or instructions for activating the first timer for switching to the TX mode for retransmission based on unsuccessfully receiving the sidelink response.

In some examples of the method, apparatuses, and non-transitory computer-readable medium described herein, the sidelink measurement signal includes one or more reference signals for a channel measurement and an indication for a measurement report and the method, apparatuses, and non-transitory computer-readable medium may include further operations, features, means, or instructions for receiving, in response to the indication for the measurement report and during the extension period of the second active duration, a report including information corresponding to the channel measurement.

In some examples of the method, apparatuses, and non-transitory computer-readable medium described herein, the one or more reference signals include a channel state information reference signal and the channel measurement includes a channel state information measurement.

In some examples of the method, apparatuses, and non-transitory computer-readable medium described herein, the sidelink control message may be a MAC-CE and associated with a media access control MAC-CE timer.

In some examples of the method, apparatuses, and non-transitory computer-readable medium described herein, the sidelink control message may be a PC5 control message and associated with an RRC timer or a PC5 sidelink timer.

In some examples of the method, apparatuses, and non-transitory computer-readable medium described herein, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

In some examples of the method, apparatuses, and non-transitory computer-readable medium described herein, the directional discontinuous cycle configuration may be based on a quality of service for the sidelink communication, a packet delay budget for the sidelink communication, a reliability parameter, a priority of the sidelink control message, or a combination thereof.

Some examples of the method, apparatuses, and non-transitory computer-readable medium described herein may further include operations, features, means, or instructions for activating, after transmitting the sidelink control message or the sidelink measurement signal, a first timer based at least in part on the first active duration, wherein activating the first timer extends the second active duration of the discontinuous cycle for the switching and for the transmitting and wherein the switching is based at least in part on activating the first timer or activating the first timer, after transmitting the sidelink control message or the sidelink measurement signal, based at least in part on a timer configuration for the first timer and a second timer for the first UE, the first timer for switching communication direction on sidelink and the second timer based at least in part on the first active duration and extending the second active duration of the discontinuous cycle, wherein the configuration message comprises the timer configuration, and wherein the switching is based at least in part on activating the first timer and activating the second timer to extend the second active duration of the discontinuous cycle based at least in part on expiration of the first timer, wherein the monitoring is based at least in part on activating the second timer and is in accordance with the configuration.

Some examples of the method, apparatuses, and non-transitory computer-readable medium described herein may further include operations, features, means, or instructions for receiving, within an extension period, a feedback message indicating the sidelink control message was received successfully and deactivating the second timer to end the extension period after receiving the feedback message.

Some examples of the method, apparatuses, and non-transitory computer-readable medium described herein may further include operations, features, means, or instructions for receiving, within an extension period, a feedback message indicating the sidelink control message was received unsuccessfully.

Some examples of the method, apparatuses, and non-transitory computer-readable medium described herein may further include operations, features, means, or instructions for deactivating the second timer to end an extension period based on unsuccessfully receiving the sidelink response.

Some examples of the method, apparatuses, and non-transitory computer-readable medium described herein may further include operations, features, means, or instructions for activating a timer for switching to the TX mode for retransmission of the sidelink control message based on unsuccessfully receiving the sidelink response.

In some examples of the method, apparatuses, and non-transitory computer-readable medium described herein, the first active duration of a discontinuous cycle for a sidelink response may be based on a quality of service parameter, including at least a latency, a reliability, or a priority, of the sidelink control message or the sidelink measurement signal, or a combination thereof.

A method for wireless communications at a first UE is described. The method may include receiving a configuration message that indicates at least a first active duration of a discontinuous cycle for a sidelink response associated a configuration for the first UE to perform sidelink communication, receiving, within a second active duration of the discontinuous cycle, a sidelink control message or sidelink measurement signal from a second UE, switching, within the second active duration of the discontinuous cycle, from a RX mode to a TX mode based on receiving the sidelink control message or the sidelink measurement signal, and transmitting, after switching from the RX mode to the TX mode and within an extension period with the first active duration of the discontinuous cycle based on the configuration message, the sidelink response to the sidelink control message or the sidelink measurement signal.

An apparatus for wireless communications at a first UE is described. The apparatus may include a processor, memory coupled with the processor, and instructions stored in the memory. The instructions may be executable by the processor to cause the apparatus to receive a configuration message that indicates at least a first active duration of a discontinuous cycle for a sidelink response associated a configuration for the first UE to perform sidelink communication, receive, within a second active duration of the discontinuous cycle, a sidelink control message or sidelink measurement signal from a second UE, switching, within the second active duration of the discontinuous cycle, from a RX mode to a TX mode base at least in part on receiving the sidelink control message or the sidelink measurement signal, and transmit, after switching from the RX mode to the TX mode and within an extension period with the first active duration of the discontinuous cycle based on the configuration message, the sidelink response to the sidelink control message or the sidelink measurement signal.

Another apparatus for wireless communications at a first UE is described. The apparatus may include means for receiving a configuration message that indicates at least a first active duration of a discontinuous cycle for a sidelink response associated a configuration for the first UE to perform sidelink communication, means for receiving, within a second active duration of the discontinuous cycle, a sidelink control message or sidelink measurement signal from a second UE, means for switching, within the second active duration of the discontinuous cycle, from a RX mode to a TX mode based on receiving the sidelink control message or the sidelink measurement signal, and means for transmitting, after switching from the RX mode to the TX mode and within an extension period with the first active duration of the discontinuous cycle based on the configuration message, the sidelink response to the sidelink control message or the sidelink measurement signal.

A non-transitory computer-readable medium storing code for wireless communications at a first UE is described. The code may include instructions executable by a processor to receive a configuration message that indicates at least a first active duration of a discontinuous cycle for a sidelink response associated a configuration for the first UE to perform sidelink communication, receive, within a second active duration of the discontinuous cycle, a sidelink control message or sidelink measurement signal from a second UE, switching, within the second active duration of the discontinuous cycle, from a RX mode to a TX mode base at least in part on receiving the sidelink control message or the sidelink measurement signal, and transmit, after switching from the RX mode to the TX mode and within an extension period with the first active duration of the discontinuous cycle based on the configuration message, the sidelink response to the sidelink control message or the sidelink measurement signal.

Some examples of the method, apparatuses, and non-transitory computer-readable medium described herein may further include operations, features, means, or instructions for activating the first timer after receiving the sidelink control message or the sidelink measurement signal based on a timer configuration for the first timer and a second timer for the first UE, the first timer for switching communication direction on sidelink and the second timer for extending the first active duration of the discontinuous cycle for sidelink communications for the first UE, where the configuration message includes the configuration, and where the switching may be based on activating the first timer and activating the second timer to extend the first active duration of the discontinuous cycle based on expiration of the first timer, where the transmitting may be based on activating the second timer and may be in accordance with the configuration.

In some examples of the method, apparatuses, and non-transitory computer-readable medium described herein, transmitting the sidelink response may include operations, features, means, or instructions for transmitting, within the extension period, a feedback message indicating the sidelink control message was received successfully and deactivating the second timer after transmitting the feedback message.

In some examples of the method, apparatuses, and non-transitory computer-readable medium described herein, transmitting the sidelink response may include operations, features, means, or instructions for transmitting, within the extension period, a feedback message indicating the sidelink control message was received unsuccessfully.

Some examples of the method, apparatuses, and non-transitory computer-readable medium described herein may further include operations, features, means, or instructions for performing a reset operation of the second timer based on transmitting the feedback message.

Some examples of the method, apparatuses, and non-transitory computer-readable medium described herein may further include operations, features, means, or instructions for activating the first timer for switching to the RX mode for retransmission based on unsuccessfully receiving the sidelink control message.

Some examples of the method, apparatuses, and non-transitory computer-readable medium described herein may further include operations, features, means, or instructions for receiving, within the first active duration, the sidelink measurement signal, where the sidelink measurement signal includes one or more reference signals for a channel measurement and an indication for a measurement report, performing a set of channel measurements based on the one or more reference signals, and transmitting, during the extension period of the second active duration, a report including information based at least in part on the set of channel measurements corresponding to the indication for the measurement report.

In some examples of the method, apparatuses, and non-transitory computer-readable medium described herein, the one or more reference signals include a channel state information reference signal and the channel measurement includes a channel state information measurement.

In some examples of the method, apparatuses, and non-transitory computer-readable medium described herein, the sidelink control message may be a PC5 control message associated with an RRC timer or a PC5 sidelink timer.

In some examples of the method, apparatuses, and non-transitory computer-readable medium described herein, the sidelink control message may be a MAC-CE associated with a MAC-CE timer.

In some examples of the method, apparatuses, and non-transitory computer-readable medium described herein, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, an RRC configuration message, or a combination thereof.

In some examples of the method, apparatuses, and non-transitory computer-readable medium described herein, the directional discontinuous cycle configuration may be based on a quality of service for the sidelink communication, a packet delay budget for the sidelink communication, a reliability parameter, a priority of the sidelink control message, or a combination thereof.

Some examples of the method, apparatuses, and non-transitory computer-readable medium described herein may further include operations, features, means, or instructions for activating a first timer, after transmitting the sidelink control message or the sidelink measurement signal, based on the first active duration and extending the second active duration of the discontinuous cycle, for the switching and for the transmitting, where the switching may be based on activating the first timer, or activating the first timer after receiving the sidelink control message or the sidelink measurement signal based on a timer configuration for the first timer and a second timer for the first UE, the first timer for switching communication direction on sidelink and the second timer based on the first active duration for extending the second active duration of the discontinuous cycle for sidelink communications for the first UE, where the configuration message includes the configuration, and where the switching may be based on activating the first timer, and activating the second timer to extend the second active duration of the discontinuous cycle based on expiration of the first timer, where the transmitting may be based on activating the second timer and may be in accordance with the configuration.

BRIEF DESCRIPTION OF THE DRAWINGS

FIGS. 3A, 3B, 4A, 4B, 5A, and 5B illustrate examples of resource diagrams that support directional sidelink DRX and operations in accordance with aspects of the present disclosure.

DETAILED DESCRIPTION

Figure 1:
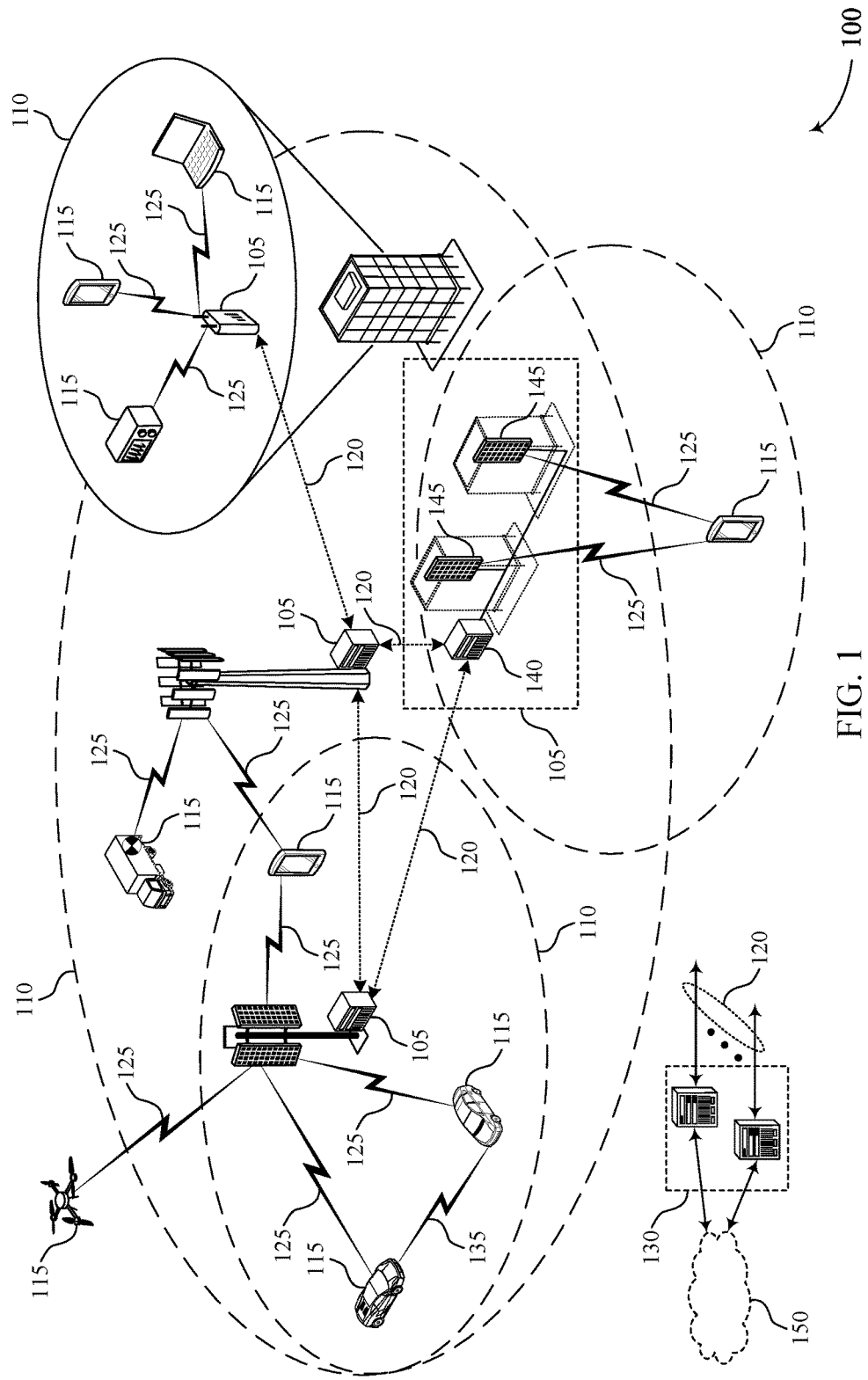
FIGS. 1 and 2 illustrate examples of wireless communications systems that support directional sidelink discontinuous reception (DRX) and operations in accordance with aspects of the present disclosure.

In some wireless communications systems, a user equipment (UE) may communicate with another UE during an on duration or active duration of a sidelink discontinuous cycle, such as a discontinuous reception (DRX) cycle. For a bidirectional DRX cycle, one or more UEs may share a DRX configuration and exchange one or more sidelink messages in both directions during the bidirectional on duration of the DRX cycles. For a unidirectional DRX cycle or directional DRX cycle, each UE may be configured with a sidelink DRX. With a directional DRX cycle, a first UE may transmit in a transmission on (TX-On) duration or receive during a reception on (RX-On) duration. A second UE may receive or transmit accordingly during the unidirectional on duration or unidirectional active duration of a directional sidelink DRX cycle for the first UE; the second UE may transmit (e.g., TX-On duration) or receive (e.g., RX-On duration) and the first UE may receive or transmit accordingly during the unidirectional on duration or unidirectional active duration of the directional sidelink DRX cycle for the second UE. In some cases, the TX-On or RX-On duration of the directional DRX cycle for the first UE may not align with the TX-On or RX-On duration of the directional DRX cycle for the second UE, which may cause delayed responses to a control signal or a control message due to unidirectional communication within a directional on duration. For example, the first UE may turn on during an RX-On duration of a directional DRX cycle to receive a message (e.g., in a reception mode (RX mode)) from a second UE, but may not transmit a response to the second UE until a subsequent RX-On duration of a directional DRX cycle for the second UE (e.g., in a RX mode).

As described herein, a second UE and a first UE may receive a control message from a base station that configures the UEs with one or more timers, such as a timer for measurement, a timer for medium access control-control element (MAC-CE) or a timer for a PC5 message. The second UE and the first UE may activate the timer to extend an active state for a directional on duration (e.g., TX-On or RX-On duration) of a directional DRX cycle, such as in a RX mode with RX-On configured or a transmission mode (TX mode) with TX-On configured for a directional on duration. The first UE may transmit (e.g., TX-On is configured for its on duration) an indication or message to the second UE to report or respond during the directional on duration (e.g., TX-On) of its directional DRX, and may switch from a TX mode to a RX mode to monitor for a sidelink response from the second UE. Similarly, the second UE may receive an indication or message to report or respond during the on duration (e.g., if a TX-On duration is configured for an on duration of the first UE) of the directional DRX cycle of the first UE may switch from a RX mode to a transmitting mode to transmit a sidelink response. In some examples, the second UE may transmit a feedback message, such as an acknowledgement (ACK) or a negative acknowledgement (NACK) based on successful reception or failed reception from the first UE, respectively. In some examples, if the second UE successfully receives the sidelink indication or message and transmits an ACK, both UEs may deactivate the timer. In some other examples, if the second UE fails to receive the indication or message, both UEs may restart the timer and may start a retransmission.

Particular aspects of the subject matter described in this disclosure may be implemented to realize one or more of the following potential advantages. The techniques employed by the described communication devices may provide benefits and enhancements to the operation of the communication devices, such as enabling a UE to switch from one communication mode (e.g., TX mode, RX mode) to another communication mode (e.g., TX mode, RX mode) during an active duration of a directional DRX cycle or directional discontinuous transmission (DTX) cycle. For example, operations performed by the described communication devices may provide improvements to measurement reporting procedures in sidelink communications by reducing latency between transmission of a signal for measurement and transmission of a measurement report for the transmitted signal. In some implementations, the operations performed by the described communication devices to reduce latency include a UE switching from a TX mode to a RX mode, or vice versa, within an active duration of the UE (e.g., an active duration associated with a directional sidelink discontinuous cycle such as a DRX cycle or a DTX cycle). In some other implementations, operations performed by the described communication devices may also support flexibility for sidelink discontinuous cycles through extension of an active duration for a UE or through utilization of timers to extend or terminate an active duration, which may improve network efficiency and reduce power consumption, among other benefits.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to directional sidelink DRX and operations.

FIG. 1 illustrates an example of a wireless communications system 100 that supports directional sidelink DRX and operations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 and a UE 115 or a UE 115 and another UE 115 may communicate according to a sidelink discontinuous cycle, such as a DRX cycle or a TX-On cycle. In some examples, the base station 105 may transmit control signaling to one or more UEs 115 including a configuration, such as a timer configuration, which may indicate one or more parameters for the sidelink discontinuous cycle at each UE 115. For example, the timer configuration may include a timer that indicates to a UE 115 when to initiate a DRX cycle, a TX-On cycle, or both. The control information may also include information regarding DRX cycles, TX-On cycles, or both for surrounding UEs 115. The base station 105 may configure a pair of source and destination UEs 115 with sidelink discontinuous cycles that may be either transmission centric (e.g., based on a mode of the source UE 115) or reception centric (e.g., based on a mode of the destination UE 115). In some examples, if the base station 105 configures one or more UEs 115 with a directional sidelink discontinuous cycle (e.g., a DRX cycle, a TX-On cycle, or both) for communicating during an active duration, the UEs 115 may wait to enter the other directional sidelink discontinuous cycle to receive or transmit a response, respectively. Thus, the directional traffic may cause a delay between an original message or signal and a responding message or signal.

In some examples, a base station 105 or network may configure one or more UEs 115 with a timer, such that the UEs 115 may switch directions for a communication mode for the duration of the timer and during a sidelink discontinuous cycle. In some examples, a timer configuration may include a timer for starting a sidelink discontinuous cycle, a timer for switching the direction of a communication mode, or both. If the timer configuration includes the timer for switching the direction of a communication mode, the UEs 115 may perform the switching operation during the active duration of a sidelink discontinuous cycle. For example, a UE 115 may transmit a sidelink message during an on duration of a TX-On cycle. In some examples, rather than waiting for the TX-On cycle to end before switching to a RX mode, the UE 115 may activate the timer after transmitting the sidelink message and may switch to a DRX mode for an on duration of a DRX cycle. Similarly, the second UE 115 may receive the sidelink message during an on duration of a DRX cycle and may activate the timer. The second UE 115 may switch to a TX-On mode for an on duration of a TX-On cycle to transmit a sidelink response.

Figure 2:
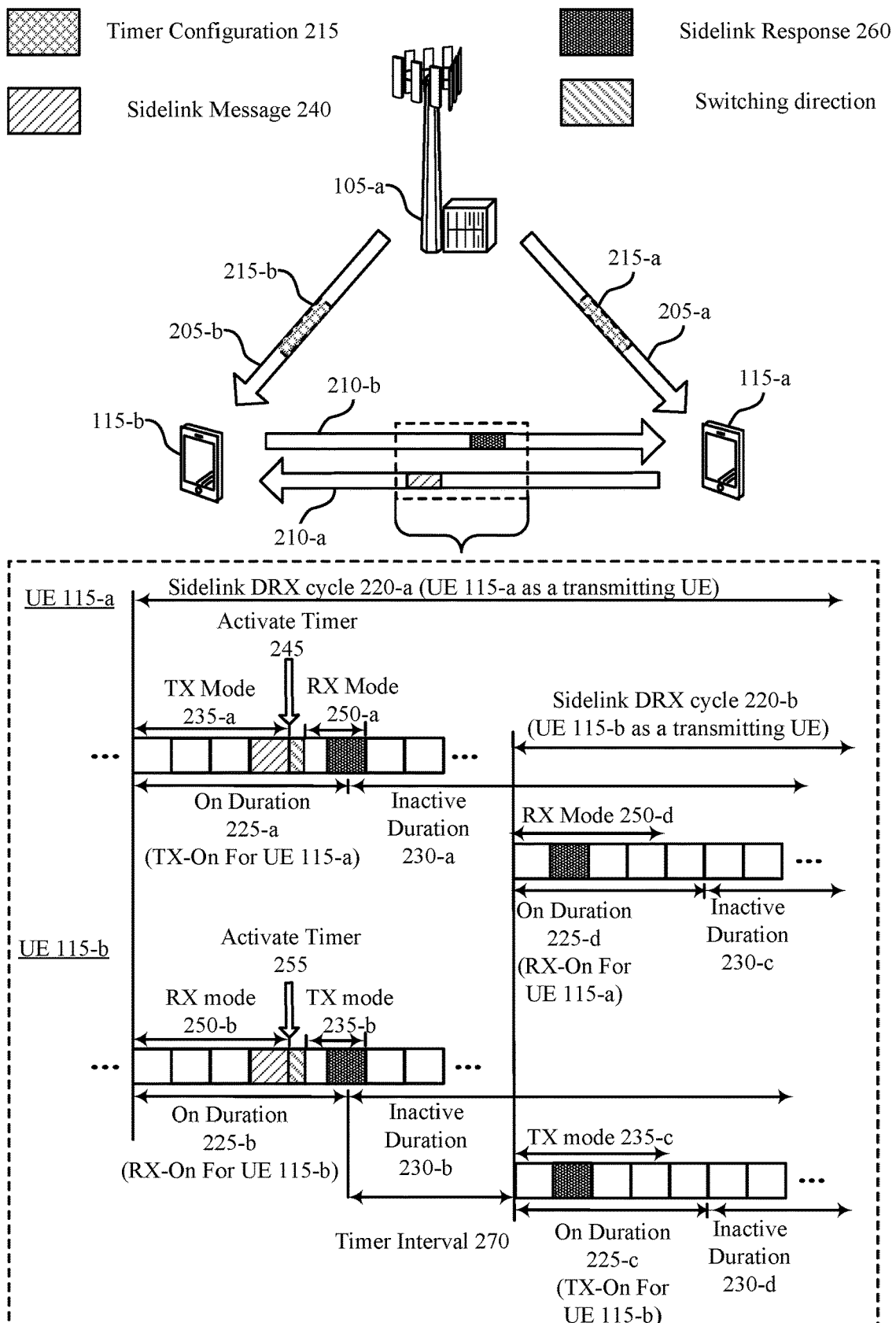

FIG. 2 illustrates an example of a wireless communications system 200 that supports directional sidelink DRX and operations in accordance with aspects of the present disclosure. In some examples, wireless communications system 200 may implement aspects of wireless communications system 100 and may include UE 115-a, UE 115-b, and base station 105-a, which may be examples of UEs 115 and a base station 105 as described with reference to FIG. 1. In some examples, base station 105-a and UE 115-a may communicate control signaling, data, or both using a communication link. For example, base station 105-a may transmit control signaling to UE 115-a, UE 115-b, or both via downlink communication links 205 (e.g., downlink communication link 205-a or downlink communication link 205-b). Similarly, in some cases, UE 115-a may communicate with another device, such as UE 115-b via a sidelink communication link 210. For example, UE 115-a my transmit control signaling or data to UE 115-b via sidelink communication link 210-a and UE 115-b may transmit control signaling or data to UE 115-a via sidelink communication link 210-b.

In some examples, UE 115-a may transmit a sidelink message 240 via sidelink communication link 210-a to UE 115-b during an on-duration (e.g., a TX-On duration of UE 115-a) or active portion of a directional DRX cycle for UE 115-a and UE 115-b may receive a sidelink message 240 via sidelink communication link 210-a from UE 115-a during the on-duration (e.g., a TX-On duration of UE 115-a) or active portion of the directional DRX cycle for UE 115-a. UE 115-a, UE 115-b, or both may extend the active portion of a respective directional DRX cycle and may switch modes to communicate a response to the sidelink message 240 (e.g., UE 115-b may switch into a TX mode and UE 115-a may switch into a RX mode). In some examples, UE 115-a and UE 115-b may be out of a coverage area for a base station 105 coverage, and may be preconfigured with the timers.

In some examples, a base station 105 and a UE 115 may communicate using RRC protocol. For example, UE 115-a and UE 115-b may operate in an RRC states, such as an RRC connected state, an RRC inactive state, an RRC idle state, or the like. In addition, UE 115-*a* and UE 115-*b* may communicate with each other on sidelink communication link 210-*a* or sidelink communication link 210-*b*, via a PC5-RRC protocol, which may be a sidelink RRC protocol. In some cases, a PC5-RRC procedure may be designed per direction. For example, UE 115-*a* may send a PC5-RRC configuration signaling from UE 115-*a* for UE 115-*a* to UE 115-*b* direction for transmitting (e.g., a TX mode) at UE 115-*a* or receiving mode (e.g., a RX mode) at UE 115-*b* and PC5-RRC configuration signaling from UE 115-*b* is for UE 115-*b* to UE 115-*a* direction for transmitting (e.g., the TX mode) at UE 115-*b* or receiving mode (e.g., the RX mode) at UE 115-*a*.

In some cases, UE 115-*a* and UE 115-*b* may communicate one or more messages with base station 105-*a* or another UEs 115 according to a DRX cycle with base station 105-*a* on Uu interface (not shown in FIG. 2) or a sidelink DRX cycle 220 on PC5 interface respectively. The sidelink DRX cycle 220 may be directional depending on communication direction for the UEs 115 and may be referred to as a directional sidelink DRX for sidelink communications (e.g., between UE 115-*a* and UE 115-*b*). For example, if the UE 115 is in a RX mode during its on duration, the directional DRX cycle may be with an RX-On duration. In some other examples, if the UE 115 is in a TX mode during its on duration, the directional DRX may be with a TX-On duration. Each sidelink DRX cycle 220 may have an on duration 225 during which the UE 115 (e.g., UE 115-*a* and UE 115-*b*) is awake for transmitting (e.g., configured with TX-On) or receiving (e.g., configured with RX-On) and an inactive duration 230 in which UE 115 (e.g., UE 115-*a* and UE 115-*b*) is in a reduced power mode (e.g., a sleep mode) to reduce power consumption.

In some examples, the periodicity of each sidelink DRX cycle 220, which may be a directional sidelink DRX cycle, as well as the on duration 225 and inactive duration 230 may be configured by the base station 105 if under base station 105 coverage, may be predetermined at the UE 115 via a preconfiguration or other UE's sidelink assistance information from another UE 115, or may be otherwise signaled to the UE 115 by another UE 115 if out of a coverage area of a base station 105. For example, base station 105-*a* may transmit control signaling, such as RRC message, a downlink control information (DCI) signal or a MAC-CE indication, or the like to UE 115-*a*, UE 115-*b*, or combination of any, if within a coverage area for base station 105-*a*. The control message or signaling may include a configuration, such as a timer configuration 215, which may include an indication of one or more parameters for the directional sidelink DRX cycle 220 at each UE 115. The timer configuration 215-*a* base station 105-*a* transmits to UE 115-*a* via downlink communication link 205-*a* may include a timer that indicates to UE 115-*a* when to initiate a switching for communication direction, for example, from TX mode to RX mode during the TX-On duration 225-*a* of UE 115-*a*'s directional sidelink DRX cycle 220-*a* for transmitting. The control information may also include information regarding this directional sidelink DRX cycles for surrounding UEs 115, such as UE 115-*b*. Similarly, the timer configuration 215-*b* base station 105-*a* transmits to UE 115-*b* via downlink communication link 205-*b* may include a timer that indicates to UE 115-*b* when to initiate a switching for communication direction, for example, from RX mode to TX mode during the RX-On duration 225-*b* of a directional sidelink DRX cycle 220-*a* for UE 115-*b*, for example, depending on directional sidelink DRX cycles 220 for other UEs 115 in communication with UE 115-*b*, such as UE 115-*a*. That is, if UE 115-*a* enters a RX mode, UE 115-*b* may enter a TX mode such that the on duration 225 of each cycle may align for directional communications on a sidelink communication link 210, which may be a unicast link. Additionally or alternatively, if UE 115-*a* enters a RX mode (e.g., with RX-On configured for on duration 225-*d* prior to an inactive duration 230-*c*) of UE115-*b*'s directional sidelink DRX cycle 220-*b* for transmitting, UE 115-*b* may enter a TX mode (e.g., with TX-On configured for on duration 225-*c* prior to an inactive duration 230-*d*) such that the on duration 225 of each cycle may align. Thus, base station 105-*a* may configure a pair of source and destination UEs 115 with directional sidelink DRX cycles 220 that may be either transmission centric (e.g., based on TX-On of UE 115's directional sidelink DRX) or reception centric (e.g., based on RX-On of the UE 115's directional sidelink DRX). In some examples, the base state may determine a directional sidelink DRX configuration with transmission centric or reception centric and the associated timer based on UE 115's sidelink assistance information, such as suitable direction (e.g., TX-On or RX-On) and suitable value(s) for on duration, suitable value(s) for timer(s), suitable value(s) for directional sidelink DRX cycle length(s), etc.

In some examples, a UE 115 may forward the UE's sidelink assistance information (e.g., from another UE 115) to a base station 105. The other UE 115 may be a UE 115 with which the UE 115 may establish PC5 connection and communicate on a PC5 link. For example, UE 115-*a* may forward other UE's sidelink assistance information (e.g., from UE 115-*b*) to base station 105-*a*. Similarly, UE 115-*b* may forward other UE's sidelink assistance information (e.g., from UE 115-*a*) to base station 105-*a*. Additionally or alternatively, the UE 115 may forward the directional sidelink DRX configuration to the other UE 115 which may be out of the coverage of base station 105. In some examples, a UE 115 may trigger a base station 105 for a directional sidelink DRX configuration with UE assistance information message or sidelink UE information message sent to base station 105-*a*. In some examples, a UE 115 may send UE assistance information message or sidelink UE information message to a base station 105 for a directional sidelink DRX configuration for another UE 115 (e.g., a UE 115 with which the UE 115 may establish PC5 connection and communicate on PC5 link) with the sidelink assistance information from the other UE 115.

In some examples, if the base station 105 configures one or more UEs 115 with a sidelink discontinuous cycle, such as a directional sidelink DRX cycle 220 (e.g., TX-On or RX-On for on duration), if a UE 115 transmits or receives during an on duration or active duration 225, the UE 115 may switch to the other direction to receive or transmit a response, respectively, based on the timer activated. For example, if UE 115-*a* transmits a message to UE 115-*b* during its on duration 225-*a* with TX mode 235-*a* (e.g., TX-On configured for UE 115-*a*) of UE 115-*a*'s directional sidelink DRX cycle 220-*a* and on duration 225-*b* with RX mode, RX-On 250-*b* (e.g., RX-On configured for UE115-*b*) for UE 115-*b*, UE 115-*a* may not receive a response from UE 115-*b* until entering RX mode 250-*d* at an on duration 225-*d* (e.g., RX-On configured for UE115-*a*) of UE 115-*b*'s directional sidelink DRX cycle 220-*b*, and UE 115-*b* may not respond until entering TX mode 235-*c* during an on duration 225-*c* (e.g., TX-On configured for UE115-*b*) of UE 115-*b*'s directional sidelink DRX cycle 220-*b*. Thus, the time interval 270 between the two directional on durations (e.g., between TX-On duration 225-*a* and RX-On duration 225-*d* for UE 115-*a* and between RX-On duration 225-*b* and TX-On duration 225-*c* for UE 115-*b*) may cause a delay between an original message or signal, such as a sidelink message 240, on sidelink communication link 210-a and a responding message or signal, such as sidelink response 260 on sidelink communication link 210-b, which may cause performance degradation or even failure for sidelink control signal or message exchanges.

In some examples, UE 115-a and UE 115-b may be configured with a timer, such that UE 115-a and UE 115-b may switch directions for a communication mode for receiving or transmitting a responding message or signal for the duration while the timer is running which may be within or partially within (as shown in FIG. 2) a directional on duration of a directional sidelink DRX cycle 220. For example, UE 115-a and UE 115-b may be preconfigured, or configured by base station 105 with a timer configuration 215-a and 215-b via downlink communication link 205-a and downlink communication link 205-b, respectively. In some examples, the timer configuration 215 may include a timer for starting a directional sidelink DRX cycle 220 (e.g., the on timer for on duration or active duration 225-a and 225-b for directional sidelink DRX cycle 220-a), an active timer for switching the direction of a communication mode, at time 245 for UE 115-a or time 255 for UE 115-b, and for response signal or message during RX mode 250-a for UE 115-a or TX mode 235-b for UE 115-b after the switching at time 245 and 255 respectively, or combination of any. If the timer configuration 215 includes the timer for switching the direction of a communication mode, UE 115-a, UE 115-b, or both may perform the switching operation during the on duration 225 of a directional sidelink DRX cycle 220.

In some cases, UE 115-a may enter on duration 225-a, which may include an on duration 225-a with transmitting mode (e.g., TX-On). UE 115-a may transmit a sidelink signal or message 240 during the on duration 225-a. For example, UE 115-a may transmit the sidelink signal or message 240 to UE 115-b via sidelink communication link 210-a. In some examples, rather than waiting for on duration 225-a to end and then staying in inactive duration 230-a of sidelink DRX cycle 220-a until to enter the RX-On duration 225-d (e.g., UE 115-b's TX-On for on duration 225-c) of sidelink DRX cycle 220-b for switching to an RX mode 250-d, UE 115-a may activate the timer at time 245 after transmitting the sidelink message 240 to switch to a RX mode 250-a to monitor the response from UE 115-b. Similarly, UE 115-b may enter on duration 225-b (e.g., UE 115-b's RX-On 250-b for on duration of sidelink DRX cycle 220-a). UE 115-b may receive the sidelink message 240 from UE 115-a during on duration 225-b and may activate the timer at time 255. UE 115-b may switch to a TX mode in active duration 225-b to transmit a response to UE 115-a based on processing the sidelink message 240.

In some other examples, UE 115-a and UE 115-b may deactivate the timer for the extended active duration 225-a and active duration 225-b (e.g., the on duration 225-a and 225-b are extended after the timer is activated for receiving or transmitting respectively the sidelink response 260) based on receiving or transmitting the sidelink response 260 respectively for the sidelink message 240. For example, UE 115-b may deactivate the active timer for TX mode 235-b with active duration 225-b extended after transmitting the sidelink response 260, and UE 115-a may deactivate the active timer for RX mode 250-a with active duration 225-a extended after receiving the sidelink response 260. In some examples, if UE 115-a does not receive the sidelink response 260, UE 115-a may activate the timer to switch to TX mode for a retransmission, and, UE 115-b may activate the timer to switch to RX mode for monitoring a retransmission.

In some examples, UE 115-a may extend on duration 225-a to monitor during the RX mode 250-a for the sidelink response 260 to the sidelink message 240. For example, if on duration 225-a ends before RX mode 250-, UE 115-a may extend on duration 225-a with the active timer for RX mode 250-a. Similarly, if on duration 225-b ends before TX mode 235-b, UE 115-b may extend on duration 225-b with the active timer for TX mode 235-b. Additionally or alternatively, if UE 115-a transmits the sidelink message 240 towards the end of on duration 225-a and on duration 225-b of sidelink DRX cycle 220-a, UE 115-a and UE 115-b may be unable to switch modes and monitor or transmit the sidelink response 260 before inactive duration 230-a and inactive duration 230-b respectively of sidelink DRX cycle 220-a. Thus, UE 115-a and UE 115-b may be capable of extending the on duration 225 of a sidelink discontinuous cycle 220 with an inactivity timer for extended active duration after transmitting or receiving the sidelink message 240, respectively.

Figure 3A:
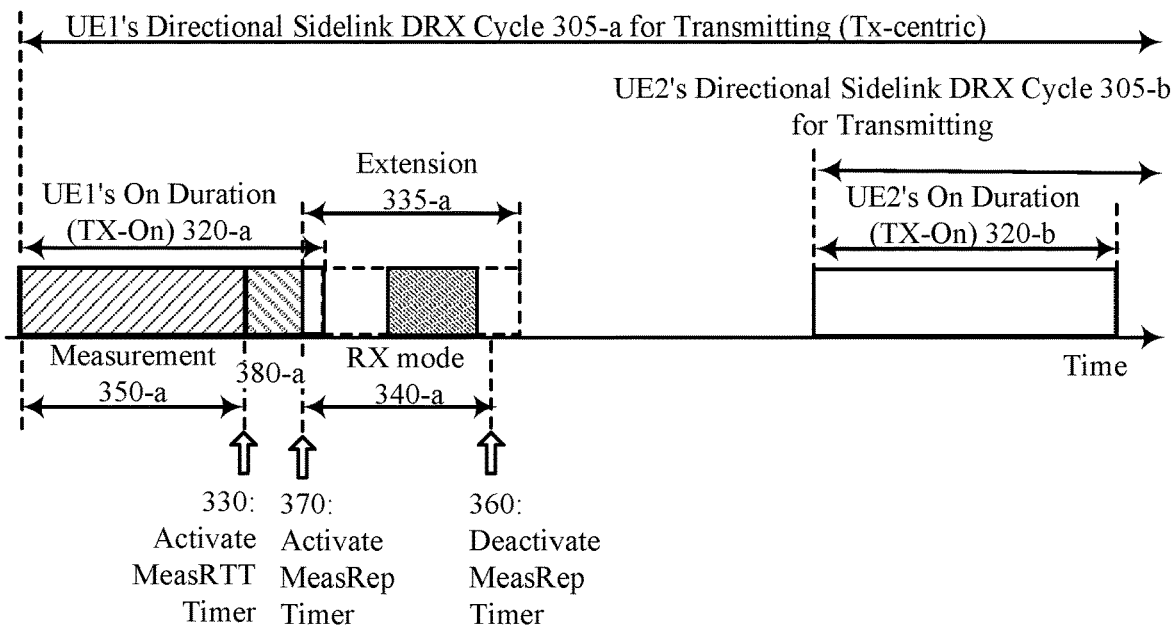
Figure 3B:
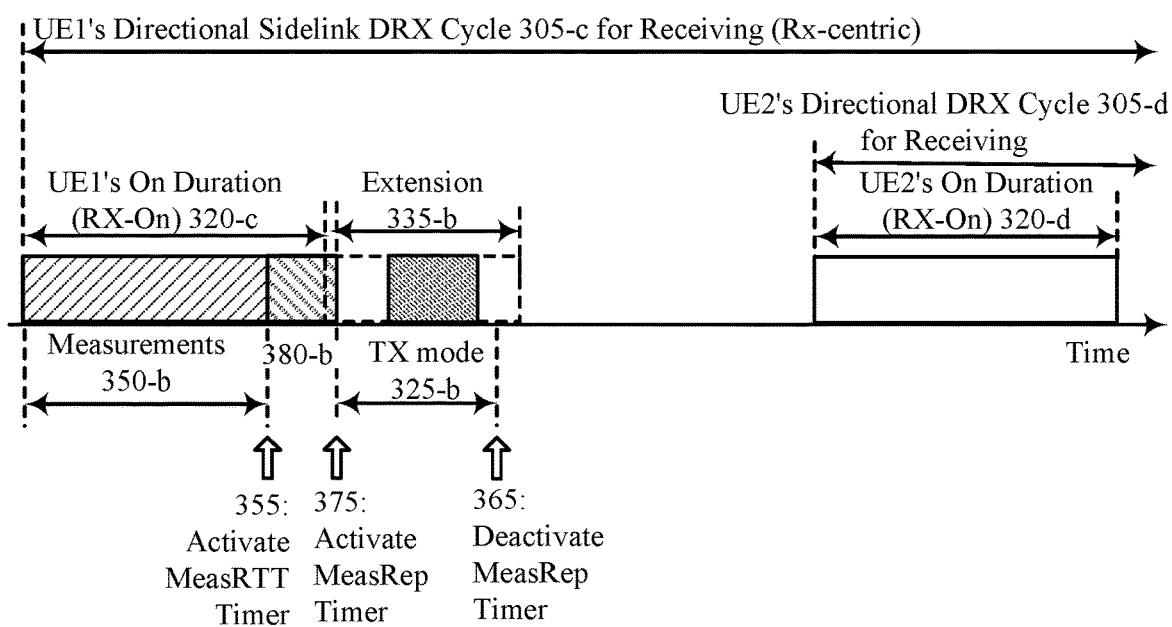

In some examples, the sidelink message 240 may include one or more reference signals and/or an indication for measurement report, which is described in further detail with respect to FIGS. 3A and 3B. UE 115-b may perform one or more measurements based on the reference signals included in the sidelink message 240 and may transmit a report to UE 115-a in the sidelink response 260. For example, UE 115-a and UE 115-b may start a CSI timer, based on the CSI report latency, after communicating (e.g., receiving or transmitting) the reference signals and indication for a CSI report carried in SCI based on one or more CSI measurements. Additionally or alternatively, the sidelink message 240 may be a MAC-CE, which is described in further detail with respect to FIGS. 4A and 4B. UE 115-b may process the MAC-CE and may transmit a feedback message in the sidelink response 260, such as an ACK or a NACK based on processing the MAC-CE. For example, UE 115-a and UE 115-b may start a MAC-CE timer based on communicating the MAC-CE and the associated latency. In some other examples, the sidelink message 240 may include one or more RRC messages, such as a PC5-RCC message, which is described in further detail with respect to FIGS. 5A and 5B. UE 115-b may process the RRC messages and may transmit a feedback message to UE 115-a in the sidelink response 260. For example, UE 115-a and UE 115-b may start a PC5 timer based on communicating the RRC messages and the associated latency. In some cases, UE 115-a, UE 115-b, or both may enable or disable the timer based on providing feedback for the sidelink response 260 or acknowledgement. In some examples, the timer may be configured based on different quality of service (QoS) parameters such as latency or packet delay budget, reliability, or priority. For example, the timer duration may be configured based on the latency requirement for a measurement report or response message. For another example, the timer duration may be configured based on the priority of a measurement report or response message.

FIGS. 3A and 3B illustrate examples of resource diagrams 300 that support directional sidelink DRX and operations in accordance with aspects of the present disclosure. In some examples, resource diagram 300-a and resource diagram 300-b may implement aspects of wireless communications system 100 and wireless communications system 200. For example, resource diagrams 300-a and resource diagram 300-b may be implemented by one or more UEs 115 in sidelink communication as described with reference to FIGS. 1 and 2. In some cases, a base station may transmit control signaling to the one or more UEs including a timer configuration for a sidelink discontinuous cycle 305 (e.g., a sidelink DRX cycle 305-*a* and a sidelink DRX cycle 305-*b*), such that the UEs may switch operation direction during an active duration of the directional DRX cycle 305. In some examples, as illustrated in FIG. 3A, a UE (e.g., UE1 as a transmitting UE) may switch from transmission after transmitting measurement signal(s) and/or indication for measurement report 310 to a RX mode 340-*a* for receiving a measurement report from another UE (e.g., UE2). Additionally or alternatively, as illustrated in FIG. 3B, the UE (e.g., UE1 as a receiving UE) may switch from reception after receiving measurement signal(s) and/or indication for measurement report 310 to a TX mode 325-*b* for transmitting a sidelink measurement report to another UE (e.g., UE2). For example, a UE (e.g., UE1) may transmit one or more reference signals for measurement and/or an indication for report 310 to another UE (e.g., UE2), which may perform one or more measurements and transmit a measurement report 315 in response.

In some examples, a UE may operate according to a sidelink discontinuous cycle 305. For example, a base station may configure a UE with a sidelink discontinuous cycle 305 with an on duration 320 and an inactive duration. The sidelink discontinuous cycle 305 may be directional (e.g., in a reception direction with RX-On or a transmission direction with TX-On for on duration 320) and may be periodic. For example, as illustrated in FIG. 3A, the UE may receive control signaling from base station indicating one or more parameters for sidelink discontinuous cycle 305-*a* (e.g., UE1's DRX cycle for transmitting), which may be configured with TX-On for the on duration 320-*a*. The control signaling may be RRC signaling, a DCI message, a MAC-CE, or the like. In some cases, the one or more parameters may include an offset indicating the start of on duration 320-*a* of sidelink DRX cycle 305-*a*, a periodicity of sidelink DRX cycle 305-*a*, an on timer of an on or active duration 320-*a*, or a combination thereof. The sidelink DRX cycle 305-*a* may be periodic such that the next active duration 320-*a*, may begin after sidelink DRX cycle 305-*a* ends. In some examples, UE1's direction sidelink DRX cycle 305-*a* may overlap with UE2's direction sidelink DRX cycle 305-*b* for transmitting, and UE2's on duration 320-*b* (TX-On).

Additionally or alternatively, as illustrated in FIG. 3B, the UE may receive control signaling from base station indicating one or more parameters for sidelink DRX cycle 305-*c*, which may be configured with RX-On for the on duration 320-*c*. In some cases, the one or more parameters may include an offset indicating the start of on duration 320-*c* of sidelink DRX cycle 305-*c*, a periodicity of sidelink DRX cycle 305-*c*, an on timer of an on or active duration 320-*c*, or a combination thereof. The sidelink DRX cycle 305-*c* may be periodic such that the next active duration, such as on duration 320-*c*, may begin after sidelink DRX cycle 305-*c* ends. In some other examples, a UE may determine a sidelink discontinuous cycle 305 based on a preconfiguration or based on another UE's sidelink assistance information. The UE may send the sidelink discontinuous cycle 305 to the other UE to communicate with the other UE. For example, as shown in FIG. 3A, UE1 may determine directional sidelink DRX cycle 305-*a* for transmitting and may send an indication of sidelink directional DRX cycle 305-*a* to UE2 via a PC5 RRC message for unicast communication with UE2. UE2 may determine sidelink directional DRX cycle 305-*b* based on a preconfiguration or anther UE's sidelink assistance information, and may send sidelink directional DRX cycle 305-*b* for transmitting to UE1 via a PC5 RRC message for unicast communications with UE1.

In some cases, the control signaling from base station or PC5 RRC message from a UE may include an indication of a round trip time (RTT) timer (e.g., MeasRTT Timer) for processing the measurements and switching communication direction for reporting. The UE may switch direction before or after its on duration ends (e.g., UE1's On Duration (TX-On) 320-*a* in FIG. 3A) to avoid delays related to waiting for entering another on duration of a sidelink DRX cycle with different communication direction (e.g., UE2's On Duration (TX-On) 320-*b* of sidelink DRX cycle 305-*b* in FIG. 3A) for a measurement report. During an active duration 320 the UE may monitor for (e.g., UE1's On Duration (RX-On) 320-*c* in FIG. 3B) or may transmit (e.g., UE1's On Duration (TX-On) 320-*a* in FIG. 3A) (e.g., depending on the direction of a sidelink discontinuous cycle 305) one or more signals and/or an indication requesting a report, which may be sent with sidelink control signaling (SCI) transmitted with reference signals and/or data.

For example, as illustrated in FIG. 3A, during on duration 320-*a*, the UE (e.g., UE1) may enter TX-On during on duration 320-*a* to transmit a sidelink message to another wireless device, such as another UE (e.g., UE2). The other UE (e.g., UE 2) may enter UE1's TX-On during on duration 320-*a* to receive a sidelink message from the UE (e.g., UE1). In some examples, the sidelink message may include one or more reference signals and/or an indication for measurement report 310 in SCI, with a reference signal such as channel state information reference signal (CSI-RS) or demodulation reference signals (DMRS). The other UE may perform measurement 350-*a* with received reference signals. For example, the UE may perform one or more CSI measurement, channel busy ratio (CBR) measurement, or reference signal received power (RSRP) measurements. In some example, the measurement 350 may be transmitted or received near the end of on duration 320, the UE and/or the other UE may extend the active duration with an inactivity timer (not shown in FIG. 3A or 3B).

At time 330, after transmitting the one or more reference signals and/or an indication in SCI for measurement report 310, the UE may activate an RTT timer (e.g., MeasRTT Timer), which may be preconfigured or configured at the UE. The timer may be preconfigured or configured based on a UE's capability or a common value for multiple UEs. In some examples, the UE may enable or disable the timer based on whether the feedback or response is enabled or not. At time 330, after receiving the one or more reference signals and/or an indication for measurement report 310, the other UE (e.g., UE2) may activate a timer (e.g., MeasRTT Timer). The UE and/or the other UE may activate the RTT timer after measurement 350 which may result RTT timer activated before or after the end of on duration 320-*a*. The UE (e.g., UE1) may switch from a TX mode to a RX mode (e.g., RX Mode 340-*a*) for monitoring the measurement report and the other UE (e.g., UE2) may process the measurements and switch from a RX mode to a TX mode for reporting the measurement while the RTT timer is running. In some examples, the RTT timer may expire before on duration 320 ends (e.g., expires at time 370 as shown in FIG. 3A) or after on duration 320 ends (e.g., expires at time 375 as shown in FIG. 3B).

The UE may extend the on duration 320-*a* for an extension 335-*a* with an active timer (e.g., MeasRep Timer) during which to monitor the report in RX mode 340-*a*. Another UE may extend the on duration 320-*a* for an extension 335-*a* with an active timer (e.g., MeasRep Timer)

during which to send the report. For example, at time 370, MeasRep Timer may be activated when MeasRTT Timer expires, which may extend active duration with extension 335-*a*. UE1 may monitor measurement report from UE2 during extension 335-*a*. The active timer may be configured based on different QoS parameters, such as latency, reliability, a priority, etc. for measurement reporting, or a combination thereof. Once the UE receives the sidelink response, which may be a measurement report 315 from the other UE (e.g., UE2), the UE may deactivate the active timer (e.g., MeasRep Timer) to end the reception (e.g., RX mode 340-*a*). Once the other UE sends the sidelink response, which may be a measurement report 315, the other UE may deactivate the active timer (e.g., MeasRep Timer) to end the extension for reporting. That is, at time 360, the UE may deactivate the active timer after receiving measurement report 315, and may enter an inactive duration of sidelink DRX cycle 305-*a* until on duration 320-*b* of the other UE's sidelink DRX cycle 305-*b* (e.g., UE2's On Duration (TX-On) 320-*b* of sidelink DRX cycle 305-*b*). The other UE may deactivate the timer after transmitting measurement report 315, and may enter an inactive duration of sidelink DRX cycle 305-*a* until on duration 320-*b* of the other UE's sidelink DRX cycle 305-*b* (e.g., UE2's On Duration (TX-On) 320-*b*).

In some examples, as illustrated in FIG. 3B, during on duration 320-*c* of sidelink DRX cycle 305-*c*, the UE (e.g., UE1) may enter RX-On during on duration 320-*c*. The UE may receive one or more reference signals and/or an indication in SCI for measurement report 310 from the other UE (e.g., UE2) based on monitoring during RX-On during on duration 320-*c*. The other UE (e.g., UE2) may enter RX-On duration 320-*c* to transmit reference signals and/or an indication in SCI for measurement report 310. The UE may perform measurements 350-*b* on the reference signals. For example, the UE may perform one or more CSI measurement, channel busy ratio (CBR) measurement, or reference signal received power (RSRP) measurements. After receiving the reference signals and/or an indication in SCI for measurement report 310 and performing the measurements 350-*b*, at tine 355, the UE may activate an RTT timer (e.g., MeasRTT Timer), which may be preconfigured or configured. The UE and/or the other UE may activate the RTT timer before the end of on duration 320-*c*. The UE (e.g., UE1) may process the measurements and/or switch from a RX mode to a TX mode (e.g., TX Mode 325-*b*) for reporting the measurement and the other UE (e.g., UE2) may switch from a TX mode to a RX mode for monitoring the measurement report while the RTT timer is running.

In some examples, the RTT timer may expire before or after (e.g., expires at time 375 as shown in FIG. 3B) on duration 320-*c* ends. The UE (e.g., UE1) may extend the active state with an extension 335-*b* with an active timer (e.g., MeasRep Timer) during which to send the report in TX mode 325-*b* and the other UE (e.g., UE2) may extend the active state with an extension 335-*b* with an active timer (e.g., MeasRep Timer) during which to monitor the report, for example, at time 375 MeasRep Timer may be activated when MeasRTT Timer expires, which may extend active duration with extension 335-*b* and UE1 may send measurement report to UE2 during extension 335-*b*. In some examples, at time 365, the UE may deactivate the active timer (e.g., MeasRep Timer) after transmitting the measurement report 315; the other UE may deactivate the active timer (e.g., MeasRep Timer) after receiving the measurement report 315. In some cases, UE1's direction sidelink DRX cycle 305-*c* for receiving may overlap with UE2's direction DRX cycle 305-*d* for receiving and UE2's on duration (RX-On 320-*d*).

Between 330 and 370, UE1 may process measurements and/or switch to reporting at 380-*a*. Further, between 355 and 375, UE1 may process measurements and/or switch to reporting at 380-*b*.

FIGS. 4A and 4B illustrate examples of resource diagrams 400 that support directional sidelink DRX and operations in accordance with aspects of the present disclosure. In some examples, resource diagram 400-*a* and resource diagram 400-*b* may implement aspects of wireless communications system 100, wireless communications system 200, and resource diagrams 300. For example, resource diagrams 400-*a* and resource diagram 400-*b* may be implemented by one or more UEs 115 in sidelink communication as described with reference to FIGS. 1 and 2. In some cases, a base station may transmit control signaling to the one or more UEs including a timer configuration for a sidelink DRX cycle 405 (e.g., a sidelink DRX cycle 405-*a* and a sidelink DRX cycle 405-*b*), such that the UEs may switch operation direction during an active duration of the directional sidelink DRX cycle 405. In some examples, as illustrated in FIG. 4A, a UE (e.g., UE1 as a transmitting UE) may switch from a transmission after transmitting a sidelink message to a RX mode 440-*a* for receiving a sidelink response from another UE (e.g., UE2). Additionally or alternatively, as illustrated in FIG. 4B, the UE (e.g., UE1 as a receiving UE) may switch from a reception after receiving a sidelink message to a TX mode 425-*b* for transmitting a sidelink response to another UE (e.g., UE2). For example, a UE (e.g., UE1) may transmit a MAC-CE message 410 to another UE, which may process the MAC-CE message 410 and transmit a feedback message 415 in response.

In some examples, a UE may operate according to a sidelink discontinuous cycle 405, as described with reference to FIGS. 3A, and 3B. For example, a base station may configure a UE with a sidelink discontinuous cycle 405 with an on duration 420 and an inactive duration. The sidelink discontinuous cycle 405 may be directional (e.g., in a reception direction with RX-On or a transmission direction with TX-On for on duration 420) and may be periodic. For example, as illustrated in FIG. 4A, the UE may receive control signaling from base station indicating one or more parameters for sidelink DRX cycle 405-*a* (e.g., UE1's sidelink DRX cycle for transmitting), which may be configured with TX-On for the on duration 420-*a*. The control signaling may be RRC signaling, a DCI message, a MAC-CE, or the like. In some cases, the one or more parameters may include an offset indicating the start of on duration 420-*a* of sidelink DRX cycle 405-*a*, a periodicity of sidelink DRX cycle 405-*a*, an on timer of an on or active duration 420-*a*, or a combination thereof. The sidelink DRX cycle 405-*a* may be periodic such that the next active duration 420-*a* may begin after sidelink DRX cycle 405-*a* ends.

Additionally or alternatively, as illustrated in FIG. 4B, the UE may receive control signaling from base station indicating one or more parameters for sidelink DRX cycle 405-*c*, which may be configured with RX-On for the on duration 420-*c*. In some cases, the one or more parameters may include an offset indicating the start of on duration 420-*c* of sidelink DRX cycle 405-*c*, a periodicity of sidelink DRX cycle 405-*c*, an on timer of an on or active duration 420-*c*, or a combination thereof. The sidelink DRX cycle 405-*b* may be periodic such that the next active duration, such as on duration 420-*c*, may begin after sidelink DRX cycle 405-*c* ends. In some cases, a UE may determine a sidelink discontinuous cycle 405 based on a preconfiguration or another UE's sidelink assistance information. The UE may send an indication of the sidelink discontinuous cycle 405 to the other UE for communications. For example, as shown in FIG. 4A, UE1 may determine directional sidelink DRX cycle 405-*a*, and may send an indication of directional sidelink DRX cycle 405-*a* for transmitting to UE2 via a PC5 RRC message for unicast communications with UE2. UE2 may determine directional sidelink DRX cycle 405-*b* based on a preconfiguration or another UE's sidelink assistance information. UE2 may send an indication of directional sidelink DRX cycle 405-*b* for transmitting to UE1 via a PC5 RRC message for unicast communications with UE1.

In some cases, the control signaling from base station or PC5 RRC message from a UE may include an indication of an RTT timer (e.g., MacCeRTT Timer) for processing the MAC-CE and/or switching communication direction for acknowledging the MAC-CE reception. The UE may switch direction before or after its on duration ends (e.g., UE1's On Duration (TX-On) 420-*a* in FIG. 4A) to avoid delays related to waiting for entering another on duration of a sidelink DRX cycle with different communication direction (e.g., UE2's On Duration (TX-On) 420-*b* of sidelink DRX cycle 405-*b* in FIG. 4A) for a response to a sidelink message. During an active duration 420 (e.g., UE1's On Duration (RX-On) 420-*c* in FIG. 4B or UE1's On Duration (TX-On) 420-*a* in FIG. 3A) the UE may monitor for or may transmit, depending on the direction of a sidelink discontinuous cycle 405, one or more signals, which may include sidelink control signaling or data.

For example, as illustrated in FIG. 4A, during on duration 420-*a*, the UE (e.g., UE1) may enter TX-On during on duration 420-*a* to transmit a sidelink message to another wireless device, such as another UE (e.g., UE2). The other UE (e.g., UE 2) may enter UE1's TX-On during on duration 320-*a* to receive a sidelink message from the UE (e.g., UE1). In some examples, the sidelink message may include a MAC-CE message 410. The MAC-CE message 410 may activate or deactivate one or more resources, carriers, DRX configuration, etc., at the second UE. Additionally or alternatively, the MAC-CE message 410 may include UE sidelink assistance information, such as resources for scheduling, measurements for resource selection, carrier selection and interference control, etc., at the second UE. In some examples, the MAC-CE message 410 may contain scheduling information to schedule one or more transmissions for the other UEs during one or more active durations 420 of a sidelink discontinuous cycle 405 for each UE. In some example, the MAC-CE message 410 may be transmitted or received near the end of on duration 420, the UE and/or the other UE may extend the active duration with an Inactivity timer not shown in FIGS. 4A, 4B.

At time 430, after transmitting the MAC-CE message 410, the UE may activate an RTT timer (e.g., MacCeRTT) preconfigured or configured. The timer may be preconfigured or configured based on UE's capability specifically or a common value for multiple UEs. In some examples, the UE may enable or disable the timer based on whether the feedback or response or an feedback message is enabled or not. The UE and/or the other UE may activate the RTT timer after MAC-CE 425-*a*, which may result in the RTT timer being activated before or after the end of on duration 420-*a*. The UE (e.g., UE1) may switch from a TX mode to a RX mode (e.g., RX Mode 440-*a*) for monitoring the response from the other UE (e.g., UE2). The other UE (e.g., UE2) may process the MAC-CE and may switch from a RX mode to a TX mode for acknowledging the received MAC-CE while the RTT timer is running. In some examples, the RTT timer may expire before on duration 420 ends (e.g., expires at time 470 as shown in FIG. 4A) or after on duration 420-*a* ends (e.g., expires at time 475 as shown in FIG. 4B).

In some examples, the UE may extend the on duration 420-*a* for an extension 435-*a* with an active timer (e.g., MacCeAck Timer) during which to monitor the acknowledgement for MAC CE in RX mode 440-*a*. The other UE may extend the on duration 420-*a* for an extension 435-*a* with an active timer (e.g., MacCeAck Timer) during which to send the acknowledgement for MAC CE. For example, at time 470 MacCeAck Timer may be activated when MacCeRTT Timer expires, which may extend active duration with extension 435-*a*. UE1 may monitor for a feedback message, such as an acknowledgement, from UE2 during extension 435-*a*. The active timer may be configured based on different QoS parameters, such as latency, reliability, a priority of the MAC-CE message 410, or a combination thereof.

Once the UE receives a sidelink response, which may be a feedback message 415, such as an acknowledgement, for the MAC-CE message 410 from the other UE (e.g., UE2), the UE may deactivate the active timer (e.g., MacCeAck Timer) to end the reception (e.g., RX mode 440-*a*). Once the other UE sends the sidelink response, which may be a feedback message 415, such as an acknowledgement, the other UE may deactivate the active timer (e.g., MacCeAck Timer) to end the extension for transmitting the acknowledgement. That is, at time 460, the UE may deactivate the active timer after receiving the feedback message 415 and may enter an inactive duration of sidelink DRX cycle 405-*a* until on duration 420-*b* of the other UE's sidelink DRX cycle 405-*b* (e.g., UE2's On Duration (TX-On) 420-*b*). The other UE may deactivate the timer after transmitting the feedback message 415 and may enter an inactive duration of sidelink DRX cycle 405-*a* until on duration 420-*b* of the other UE's sidelink DRX cycle 405-*b* (e.g., UE2's On Duration (TX-On) 420-*b*).

In some examples, the feedback message for acknowledgement may be an ACK if the UE receives the MAC-CE message 410 successfully or may be a NACK if the UE fails to receive the MAC-CE message 410 or receives the MAC-CE message incorrectly. If the feedback message 415 for acknowledgement is an ACK, the UE may deactivate the timer at 460. Otherwise, if the feedback message 415 for acknowledgement is a NACK, the UE may active the timer for a retransmission if enabled. The retransmission timer may be included in control signaling from a base station or may be otherwise configured or preconfigured at the UE.

In some examples, as illustrated in FIG. 4B, during on duration 420-*c* of sidelink DRX cycle 405-*c*, the UE (e.g., UE1) may enter RX-On during on duration 420-*c*. The UE may receive the MAC-CE message 410 from another UE (e.g., UE2) based on monitoring during RX-On duration. The UE may perform a MAC-CE processing operation 450-*b* to process the MAC-CE message 410. The MAC-CE processing operation 450-*b* may include receiving the MAC-CE message 410, decoding the MAC-CE message 410, or the like. After receiving and processing the MAC-CE message 410, at time 455, the UE may activate the RTT timer (e.g., MacCeRTT Timer), which may be preconfigured or configured. The UE and/or the other UE may activate the RTT timer after MAC-CE 450-*b*, which may result in the RTT timer being activated before or after the end of on duration 420-*c*. The UE (e.g., UE1) may switch from a RX mode to a TX mode for transmitting a feedback message, such as an ACK or NACK to the MAC CE. The other UE (e.g., UE2) may switch from a TX mode to a RX mode for monitoring for the feedback message, or ACK or NACK, while the RTT timer is running.

In some examples, the RTT timer may expire before or after (e.g., expires at time 475 as shown in FIG. 4B) on duration 420-c ends. The UE may extend the active state with an extension 435-b with an active timer (e.g., MacCeAck Timer) during which to send the acknowledgement while operating in TX mode 425-b. The other UE (e.g., UE2) may extend the active state with an extension 435-b with an active timer (e.g., MacCeAck Timer) during which to monitor for the acknowledgement. For example, at time 475, a MacCeAck Timer may be activated when the MacCeRTT Timer expires, which may extend active duration with extension 435-b. UE1 may send an acknowledgement to UE2 during extension 435-b. In some examples, at time 465, if the UE successfully processes the MAC-CE message 410 and transmits an ACK for acknowledgement, the UE may deactivate the active timer (e.g., MacCeAck) after transmitting the feedback message 415. The other UE may deactivate the active timer (e.g., MacCeAck Timer) after receiving the feedback message 415 with an ACK. In some other examples, if the UE fails to successfully process the MAC-CE message 410 and transmits a NACK, the UE may restart the RTT timer and then the active timer for a retransmission after transmitting the feedback message 415, if enabled. The other UE may deactivate the timer after transmitting the feedback message 415 and may enter an inactive duration of sidelink DRX cycle 405-d until on duration 420-d of the other UE's sidelink DRX cycle 405-d (e.g., UE2's On Duration (TX-On) 420-d).

Between 430 and 470, UE1 may process measurements and/or switch to reporting at 480-a. Further, between 455 and 475, UE1 may process measurements and/or switch to reporting at 480-b.

FIGS. 5A and 5B illustrate examples of resource diagrams 500 that support directional sidelink DRX and operations in accordance with aspects of the present disclosure. In some examples, resource diagram 500-a and resource diagram 500-b may implement aspects of wireless communications system 100, wireless communications system 200, resource diagrams 400, and resource diagrams 500. For example, resource diagrams 500-a and resource diagram 500-b may be implemented by one or more UEs 115 in sidelink communication as described with reference to FIGS. 1 and 2. In some cases, a base station may transmit control signaling to the one or more UEs including a timer configuration for a sidelink DRX cycle 505 (e.g., a sidelink DRX cycle 505-a and a sidelink DRX cycle 505-b), such that the UEs may switch operation direction during an active duration of the directional sidelink DRX cycle 505. In some examples, as illustrated in FIG. 5A, a UE (e.g., UE1 as a transmitting UE) may switch from transmission after transmitting a sidelink message to a RX mode 540-a for receiving a sidelink response from another UE 9 e.g., UE2). Additionally or alternatively, as illustrated in FIG. 5B, the UE (e.g., UE1 as a receiving UE) may switch from reception after receiving a sidelink message to a TX mode 525-b for transmitting a sidelink response to another UE (e.g., UE2). For example, a UE (e.g., UE1) may transmit a PC5 message 510 to another UE, which may process the PC5 message 510 and transmit a feedback message 515 in response.

In some examples, a UE may operate according to a sidelink discontinuous cycle 505, as described with reference to FIGS. 3A, 3B, 4A, and 4B. For example, a base station may configure a UE with a sidelink discontinuous cycle 505 with an active duration 520 and an inactive duration. The sidelink discontinuous cycle 505 may be directional (e.g., in a reception direction with an RX-On or a transmission direction with TX-On for on duration 420) and may be periodic. For example, as illustrated in FIG. 5A, the UE may receive control signaling from base station indicating one or more parameters for sidelink DRX cycle 505-a (e.g., UE1's sidelink DRX cycle for transmitting), which may be configured with TX-On for the on duration 520-a. The control signaling may be RRC signaling, a DCI message, a MAC-CE, or the like. In some cases, the one or more parameters may include an offset indicating the start of on duration 520-a of sidelink DRX cycle 505-a, a periodicity of sidelink DRX cycle 505-a, an on timer of an on or active duration 520-a, or a combination thereof. The sidelink DRX cycle 505-a may be periodic such that the next active duration 520, such as on duration 520-a, may begin after sidelink DRX cycle 505-a ends.

Additionally or alternatively, as illustrated in FIG. 5B, the UE may receive control signaling from base station indicating one or more parameters for sidelink DRX cycle 505-c, which may be configured with RX-On for the on duration 420-c. In some cases, the one or more parameters may include an offset indicating the start of on duration 520-c of sidelink DRX cycle 505-c, a periodicity of sidelink DRX cycle 505-c, an on timer of an on or active duration, or a combination thereof. The sidelink DRX cycle 505-c may be periodic such that the next active duration, such as on duration 520-c, may begin after sidelink DRX cycle 505-c ends. In some cases, a UE may determine a sidelink discontinuous cycle 505 based on a preconfiguration or another UE's sidelink assistance information. The UE may send an indication of the sidelink discontinuous cycle 505 to the other UE for communications. For example, as shown in FIG. 4A, UE1 may determine directional sidelink DRX cycle 505-a and may send an indication of directional sidelink DRX cycle 505-a to UE2 via a PC5 RRC message for unicast communications with UE2. UE2 may determine directional sidelink DRX cycle 505-b based on a preconfiguration or another UE's assistance information, and may send an indication of directional sidelink DRX cycle 505-b to UE1 via a PC5 RRC message for unicast communications with UE1.

In some cases, the control signaling from base station or PC5 RRC message from a UE may include an indication of an RTT timer (e.g., PC5RTT Timer) for processing the PC5 message and/or switching communication direction for response. The UE may switch direction before or after its on duration ends (e.g., UE1's On Duration (TX-On) 520-a in FIG. 5A) to avoid delays related to waiting for entering another on duration with different communication direction (e.g., UE2's On Duration (TX-On) 520-b in FIG. 4A) for a response to a sidelink message. During an active duration 520 (e.g., UE1's On Duration (RX-On) 520-c in FIG. 5B or UE1's On Duration (TX-On) 520-a in FIG. 5A) the UE may monitor for or may transmit, depending on the direction of a sidelink discontinuous cycle 505, one or more signals, which may include sidelink control signaling or data.

For example, as illustrated in FIG. 5A, during on duration 520-a, the UE (e.g., UE1) may enter TX-On duration 525-a to transmit a sidelink message to another wireless device, such as another UE (e.g., UE2). The other UE (e.g., UE2) may enter UE1's TX-On during on duration 520-a to receive a sidelink message from the UE (e.g., UE1). In some examples, the sidelink message may include RRC signaling, such as a PC5-RRC message or PC5 message 510. The UE receiving the PC5 message 510 may perform a relatively quick response, if enabled. In some cases, the PC5 message may include PC5 signaling (e.g., a PC5-sidelink (PC5-S)) messages such as a direct communication request, a direction communication accept, a link identifier update request, a link identifier update response, a link modification request, a link modification accept, a keep alive parameter, a feedback message, a PC5 RRC configuration message (e.g., RRCReconfigurationSidelink parameter, RRCReconfigurationCompleteSidelink parameter, or RRCReconfigurationFailureSidelink parameter), or a combination thereof. In some example, the PC5 message 510 may be transmitted or received near the end of on duration 520-a. The UE and/or the other UE may extend the active duration with an inactivity timer 590, as shown in FIG. 5A.

At time 530, after transmitting the PC5 message 510, the UE may activate an RTT timer (e.g., PC5RTT) preconfigured or configured. The timer may be preconfigured or configured based on a UE's capability or a common value for multiple UEs. In some examples, the UE may enable or disable the PC5 timer based on whether the feedback or response is enabled or not. The UE and/or the other UE may activate the RTT timer before the end of on duration 520-a. The UE (e.g., UE1) may switch from a TX mode to a RX mode (e.g., RX Mode 540-a) for monitoring the response from the other UE (e.g., UE2). The other UE (e.g., UE2) may process the PC5 message and/or switch from a RX mode to a TX mode for responding the received PC5 message while the RTT timer is running. In some examples, the RTT timer may expire before or after (as shown in FIG. 5A) on duration 520-a ends.

In some examples, the UE may extend the on duration 520-a for an extension 535-a with an active timer (e.g., PC5Res Timer) during which to monitor the response in RX mode 540-a. The other UE may extend the on duration 520-a for an extension 535-a with an active timer (e.g., PC5Res Timer) during which to send the response. For example, at time 570, PC5Res Timer may be activated when PC5RTT Timer expires, which may extend active duration with extension 535-a. In some cases, UE1 may monitor for a response from UE2 during extension 535-a. The active timer may be preconfigured or configured based on different QoS parameters, such as latency, packet delay budget, reliability, a priority, etc. of the radio bearer(s), or a combination thereof.

Once the UE receives a sidelink response, which may be a feedback message 515 for the PC5 message 510 from the other UE (e.g., UE2), the UE may deactivate the active timer (e.g., PC5Res Timer) to end the reception (e.g., RX mode 540-a). Once the other UE sends the sidelink response, which may be a feedback message 515, the other UE may deactivate the active timer (e.g., PC5Res Timer) to end the extension for response. That is, at time 560, the UE may deactivate the active timer after receiving the feedback message 515 and may enter an inactive duration of sidelink DRX cycle 505-a until on duration 520-b of the other UE's sidelink DRX cycle 505-b (e.g., UE2's On Duration (TX-On) 520-b). The other UE may deactivate the timer after transmitting the feedback message 515 and may enter an inactive duration of sidelink DRX cycle 505-a until on duration 520-b of the other UE's sidelink DRX cycle 405-b (e.g., UE2's On Duration (TX-On) 520-b).

In some examples, the feedback message for response may be an Accept, Reject, ACK, NACK, Complete, Failure, etc. For example, the feedback message may be an ACK or Accept or Complete if the UE receives the PC5 message 510 successfully or may be a NACK or Reject or Failure if the UE fails to receive the PC5 message 510 or receives the PC5 message incorrectly. If the feedback message 515 is an ACK or Accept or Complete, the UE may deactivate the timer at time 560. Otherwise, if the feedback message 515 is a NACK or Reject or failure, the UE may restart the RTT timer and then active the timer for a retransmission if enabled. The retransmission timer may be included in control signaling from a base station or may be otherwise configured or preconfigured at the UE.

In some examples, as illustrated in FIG. 5B, during on duration 520-c of sidelink DRX cycle 505-c, the UE (e.g., UE1) may enter RX-On duration 520-c. The UE may receive the PC5 message 510 from another UE (e.g., UE2) based on monitoring during RX-On duration. The UE may perform a PC5 processing operation 550-b to process the PC5 message 510. The PC5 processing operation 550-b may include receiving the PC5 message 510, decoding the PC5 message 510, or the like. After receiving and processing the PC5 message 510, at time 555, the UE may activate the RTT timer (e.g., PC5RTT Timer), which may be preconfigured or configured. The UE and/or the other UE may activate the RTT timer after PC5 processing operation 550-b, which may result in the RTT timer being activated before or after the end of on duration 520-c. The UE (e.g., UE1) may switch from a RX mode to a TX mode for transmitting a feedback message 515. The other UE (e.g., UE2) may switch from a TX mode to a RX mode for monitoring the feedback message 515 while the RTT timer is running.

In some examples, the UE may extend the active state with an extension 535-b with an active timer (e.g., PC5Res Timer) during which to send the response in TX mode 525-b. The other UE (e.g., UE2) may extend the active state with an extension 535-b with an active timer (e.g., PC5Res Timer) during which to monitor the response. For example, at time 575, a PC5Res Timer may be activated when the PC5RTT Timer expires, which may extend an active duration with extension 435-b. UE1 may send a response to UE2 during extension 535-b. In some examples, at time 565, if the UE successfully processes the PC5 message 510 and transmits an ACK, Accept, or Complete, the UE may deactivate the active timer (e.g., PC5Res Timer) after transmitting the feedback message 515. The other UE may deactivate the active timer (e.g., PC5Res Timer) after receiving the ACK, Accept, or Complete. In some other examples, if the UE fails to successfully process the PC5 message 510 and transmits a NACK or Reject or Failure, the UE may restart the RTT timer and then the active timer for a retransmission after transmitting the feedback message 515, if enabled. The other UE may deactivate the timer after transmitting the feedback message 515 and may enter an inactive duration of sidelink DRX cycle 505-d until on duration 520-d of the other UE's sidelink DRX cycle 505-d (e.g., UE2's On Duration (TX-On) 520-d).

Between 530 and 570, UE1 may process measurements and/or switch to reporting at 580-a. Further, between 555 and 575, UE1 may process measurements and/or switch to reporting at 580-b.

Figure 6:
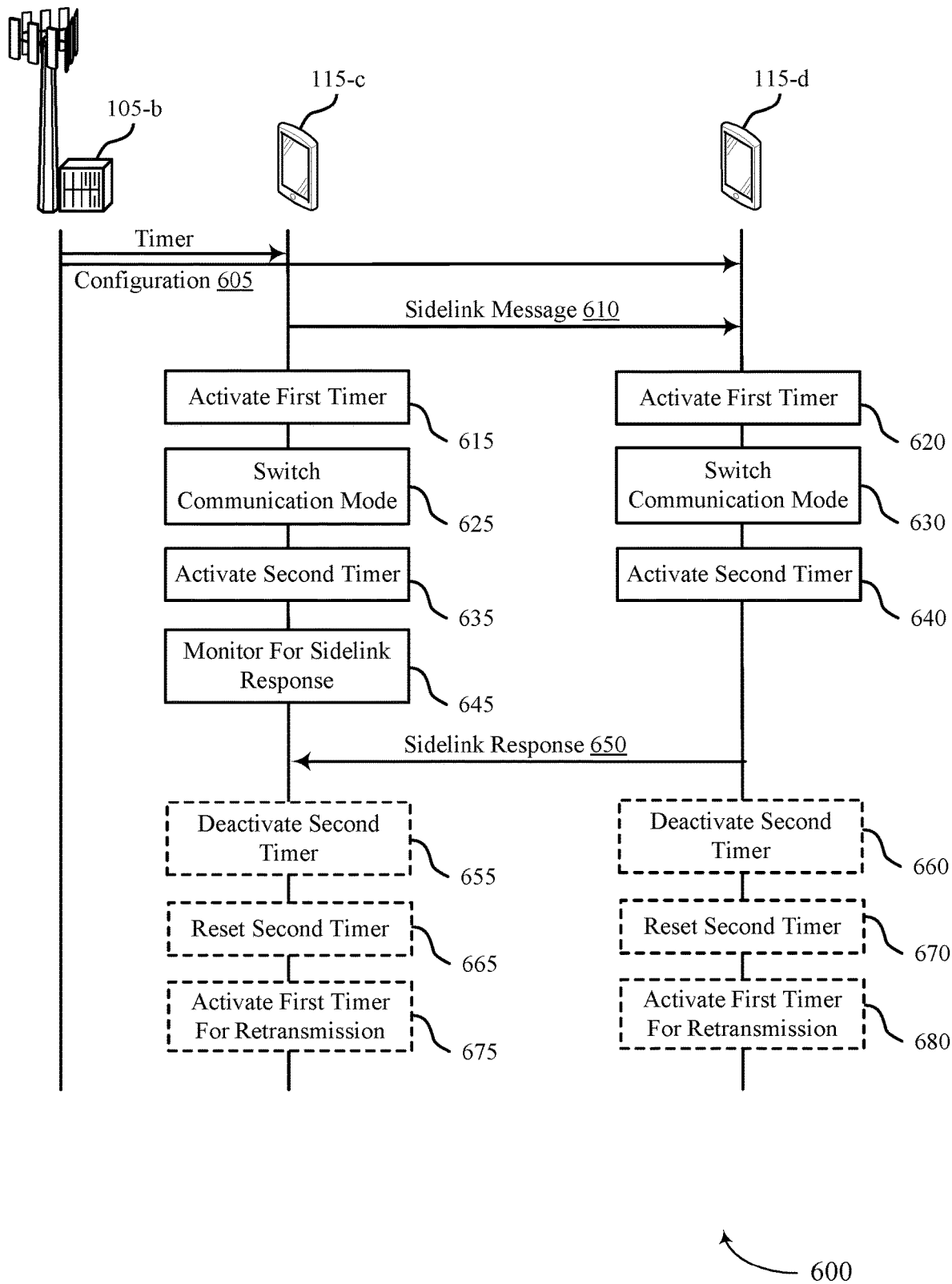
FIGS. 6 and 7 illustrate examples of process flows that support directional sidelink DRX and operations in accordance with aspects of the present disclosure.

FIG. 6 illustrates an example of a process flow 600 that supports directional sidelink DRX and operations in accordance with aspects of the present disclosure. In some examples, process flow 600 may implement aspects of wireless communications system 100, wireless communications system 200, and resource diagram 3A through 5B. The process flow 600 may illustrate an example of base station 105-b configuring UE 115-c and UE 115-d with a timer configuration for switching communication direction during a sidelink discontinuous cycle. Alternative examples of the following may be implemented, where some processes are performed in a different order than described or are not performed. In some cases, processes may include additional features not mentioned below, or further processes may be added.

At 605, base station 105-b may transmit a configuration message to UE 115-c and UE 115-d that indicates a configuration for one or more timers. For example, the timer configuration may indicate a first timer and a second timer, the first timer for switching communication direction on sidelink and the second timer for extending an active duration of a discontinuous cycle for sidelink communications for UE 115-c and UE 115-d.

At 610, UE 115-c may transmit a sidelink message to UE 115-d. UE 115-c may transmit the sidelink message within the active duration of the discontinuous cycle. In some cases, the sidelink message may be a sidelink control message or sidelink measurement signal. The sidelink measurement signal may include one or more reference signals for a channel measurement (e.g., CSI reference signals).

At 615 and 620, UE 115-c and UE 115-d may activate the first timer from the timer configuration, respectively. For example, UE 115-c may activate the first timer after transmitting the sidelink control message or sidelink measurement signal. UE 115-d may activate the first timer after receiving the sidelink message.

At 625 and 630, UE 115-c and UE 115-d may switch communication modes.

For example, at 625, UE 115-c may switch from a TX mode to a RX mode after activating the first timer. Additionally or alternatively, at 630, UE 115-d may switch from a RX mode to a TX mode after activating the first timer.

At 635 and 640, UE 115-c and UE 115-d may activate the second timer from the timer configuration, respectively. The second timer may extend an active duration of the discontinuous cycle after the first timer expires (e.g., after the active duration ends). The active duration of the discontinuous cycle may continue until the second timer expires or until UE 115-d transmits a sidelink response to UE 115-c.

At 645, UE 115-c may monitor for the sidelink response from UE 115-d after switching from the TX mode to the RX mode. The sidelink response may be in response to the sidelink control message or the sidelink measurement signal. In some cases, UE 115-c may monitor during an extension period of the active duration.

At 650, UE 115-d may transmit the sidelink response to UE 115-c within the extension period. For example, UE 115-d may transmit a feedback message (e.g., an ACK or a NACK) for the sidelink message. If UE 115-d receives the sidelink message successfully, UE 115-d may transmit an ACK to UE 115-c. If UE 115-d receives the sidelink message unsuccessfully, UE 115-d may transmit a NACK to UE 115-c. In some cases, the sidelink response may be a report including information for one or more channel measurements performed by UE 115-d (e.g., a CSI measurement report).

At 655 and 660, UE 115-c and UE 115-d may deactivate the second timer, respectively, For example, if UE 115-d successfully receives the sidelink message and transmits an ACK, UE 115-c and UE 115-d may deactivate the second timer. UE 115-c may deactivate the second timer after receiving the sidelink response, and UE 115-d may deactivate the second timer after transmitting the sidelink response.

At 665 and 670, if UE 115-d unsuccessfully receives the sidelink message and transmits a NACK to UE 115-c, UE 115-c and UE 115-d may reset the second timer, respectively. For example, UE 115-c and UE 115-d may perform a reset operation of the second timer based on unsuccessfully receiving the sidelink message, the sidelink response, or both.

At 675 and 680, UE 115-c and UE 115-d may activate the first timer for a retransmission, respectively.

In some cases, the sidelink control message may be a MAC-CE and the second timer may be a MAC-CE timer. In some other cases, the sidelink control message may be a PC5 control message and the second timer may be an RRC timer or a PC5 sidelink timer. In some examples, the sidelink control message may be a direct communication request, a direct communication accept, a link identifier update request, a link identifier update response, a link identifier update feedback message, a disconnect request, a disconnect response, a link modification request, a link modification accept, a feedback message, a keep-alive message, an RRC configuration message, or a combination thereof.

In some examples, the timer configuration may be based on a QoS for the sidelink communications, a packet delay budget for the sidelink communications, a reliability parameter, a priority of the control message, or a combination thereof.

Figure 7:
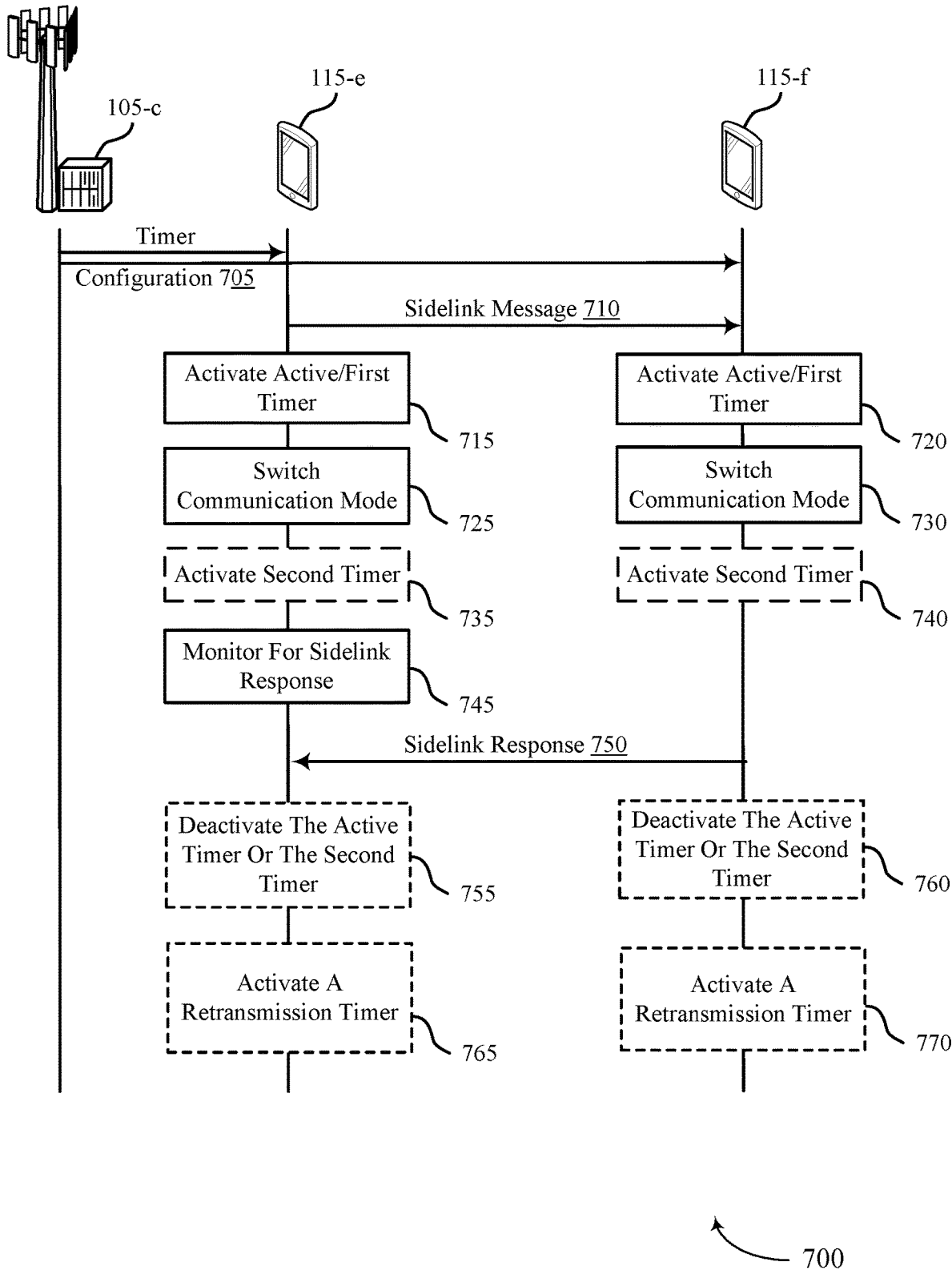

FIG. 7 illustrates an example of a process flow 700 that supports directional sidelink DRX and operations in accordance with aspects of the present disclosure. In some examples, process flow 700 may implement aspects of wireless communications system 100, wireless communications system 200, and resource diagram 3A through 5B. The process flow 700 may illustrate an example of base station 105-c configuring UE 115-e and UE 115-f with a timer configuration for switching communication direction during a sidelink discontinuous cycle. Alternative examples of the following may be implemented, where some processes are performed in a different order than described or are not performed. In some cases, processes may include additional features not mentioned below, or further processes may be added.

At 705, base station 105-c may transmit a configuration message to UE 115-e and UE 115-f that indicates a configuration for one or more timers. For example, the timer configuration may indicate one or more timers for switching communication direction and transmitting or receiving the response signal or message with a directional sidelink DRX. In some aspects, as illustrated in FIG. 2, one active timer may be activated for switching communication direction and then transmitting or receiving the response signal or message for UE 115-e and UE 115-f respectively after the switching. In some other aspects, as illustrated in FIGS. 3A-5B, a first timer may be activated for switching communication direction and a second timer for extending an active duration for transmitting or receiving the response signal or message for UE 115-e and UE 115-f respectively after the switching.

At 710, UE 115-e may transmit a sidelink message to UE 115-f. UE 115-e may transmit the sidelink message within the active duration of a sidelink discontinuous cycle. In some cases, the sidelink message may be a sidelink control message or sidelink measurement signal and/or measurement report indication in SCI. The sidelink measurement signal may include one or more reference signals for a channel measurement (e.g., CSI reference signals).

At 715 and 720, UE 115-e and UE 115-f may activate an active timer (e.g., the timer shown in FIG. 2) based on the timer configuration for one timer or activate a first timer (e.g. the first timer shown in FIGS. 3A-5B) based on the timer configuration for two timers, respectively. For example, UE 115-e may activate the active timer or the first timer after transmitting the sidelink control message or sidelink measurement signal. UE 115-*f* may activate the active timer or the first timer after receiving the sidelink control message or sidelink measurement signal (e.g., starting an active duration for a sidelink response to the sidelink control message or sidelink measurement signal).

At 725 and 730, UE 115-*e* and UE 115-*f* may switch communication modes. For example, at 725, UE 115-*e* may switch from a TX mode to a RX mode after activating the active timer or the first timer. Additionally or alternatively, at 730, UE 115-*f* may switch from a RX mode to a TX mode after activating the active timer or the first timer.

At 735 and 740, UE 115-*e* and UE 115-*f* may activate the second timer (e.g. the second timer shown in FIGS. 3A-5B) when the first timer expires and based on the timer configuration for the two timers, respectively. The second timer may extend an active duration of the sidelink discontinuous cycle after the first timer expires. The active duration of the sidelink discontinuous cycle extended with the active timer or the second timer for a sidelink response may continue until the active timer or the second timer expires or after UE 115-*f* transmits a sidelink response to UE 115-*e* or UE 115-*e* receives a sidelink response from UE 115-*f*.

At 745, UE 115-*e* may monitor for the sidelink response from UE 115-*f* after switching from the TX mode to the RX mode. The sidelink response may be in response to the sidelink control message or the sidelink measurement signal. In some cases, UE 115-*e* may monitor during an extension period of the active duration while the active timer or the second timer is running.

At 750, UE 115-*f* may transmit the sidelink response to UE 115-*e* within the extension period (e.g., extended with the active timer or the second timer). For example, UE 115-*f* may transmit a feedback message (e.g., an ACK or a NACK) for the sidelink control message. If UE 115-*f* receives the sidelink control message successfully, UE 115-*f* may transmit an ACK to UE 115-*e*. If UE 115-*f* receives the sidelink control message unsuccessfully, UE 115-*f* may transmit a NACK to UE 115-*e*. In some cases, the sidelink response may be a measurement report including information for one or more channel measurements performed by UE 115-*f* (e.g., a CSI measurement report).

At 755 and 760, UE 115-*e* and UE 115-*f* may terminate the active duration for sidelink response by deactivating the active timer or the second timer, respectively. For example, if UE 115-*f* successfully receives the sidelink control message and transmits an ACK, UE 115-*e* and UE 115-*f* may deactivate the active timer or the second timer. UE 115-*e* may deactivate the active timer or the second timer after receiving the sidelink response (e.g., ACK or NACK), and UE 115-*f* may deactivate the active timer or the second timer after transmitting the sidelink response (e.g., ACK or NACK).

At 765 and 770, if UE 115-*f* unsuccessfully receives the sidelink message and transmits a NACK to UE 115-*e*, UE 115-*e* and UE 115-*f* may activate a retransmission timer for a retransmission (e.g., a retransmission of the sidelink control message from UE 115-*e* to UE 115-*f*), respectively.

In some cases, the sidelink control message may be a MAC-CE and the active timer or the second timer may be a MAC-CE timer. In some other cases, the sidelink control message may be a PC5 control message and the active timer or the second timer may be an RRC timer or a PC5 timer. In some examples, the sidelink control message may be a direct communication request, a direct communication accept, a link identifier update request, a link identifier update response, a link identifier update feedback message, a disconnect request, a disconnect response, a link modification request, a link modification accept, a feedback message, a keep-alive message, an RRC configuration message, or a combination thereof.

In some examples, the timer configuration may be based on a QoS parameter for the sidelink measurement or control message, a delay budget, a reliability parameter, a priority of the control message, or a combination thereof. For example, the active timer in FIG. 2 or the combination of the first timer and the second timer in FIGS. 3A-5B may be configured based on the latency requirement for the measurement report or the response message, the priority for the measurement report or the response message, or a combination thereof.

Figure 8:
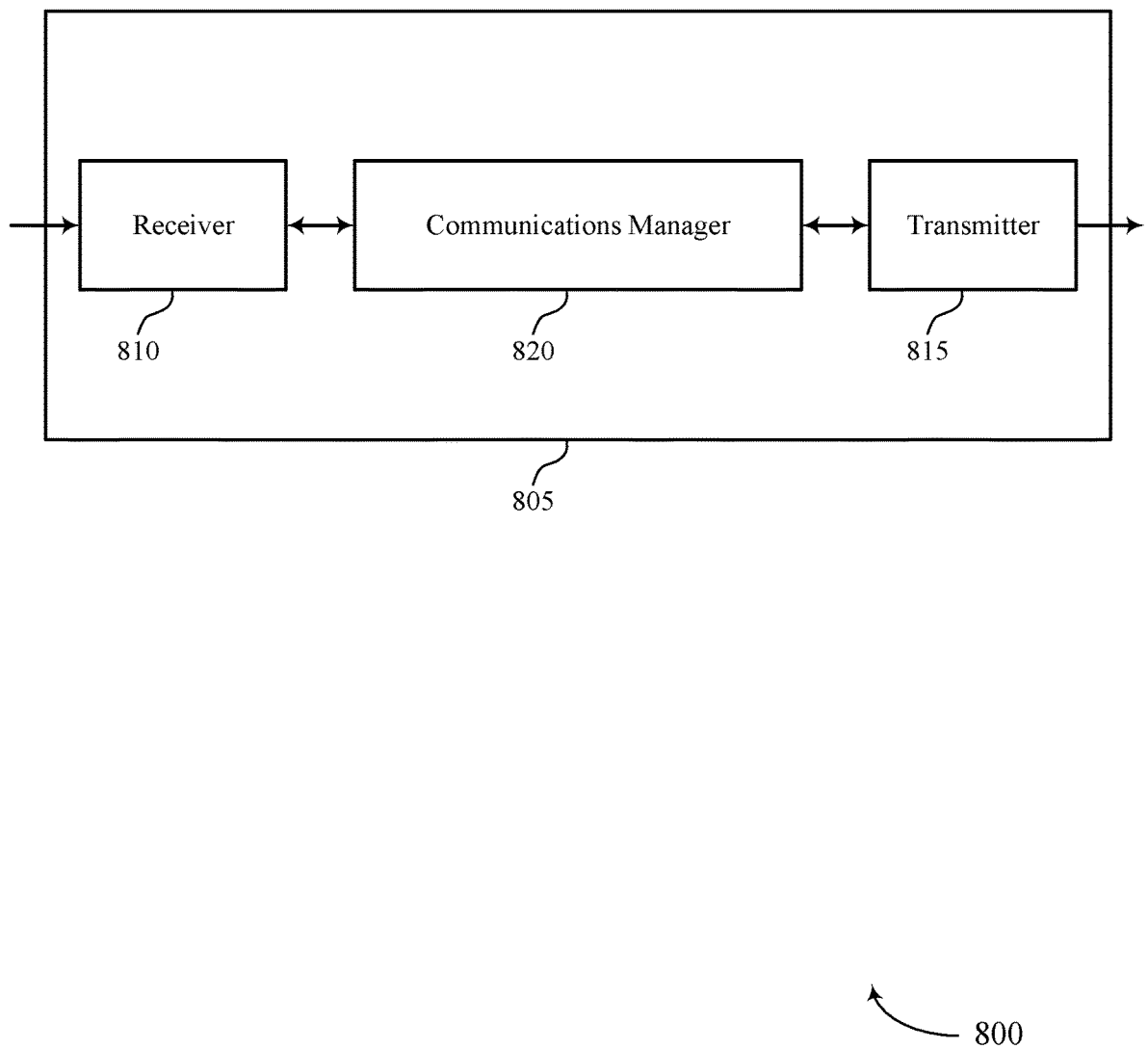
FIGS. 8 and 9 show block diagrams of devices that support directional sidelink DRX and operations in accordance with aspects of the present disclosure.

FIG. 8 shows a block diagram 800 of a device 805 that supports directional sidelink DRX and operations in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to directional sidelink DRX and operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to directional sidelink DRX and operations). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of directional sidelink DRX and operations as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. For example, the communications manager 820 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The communications manager 820 may be configured as or otherwise support a means for transmitting, within the active duration of the discontinuous cycle, a sidelink control message or sidelink measurement signal to a second UE. The communications manager 820 may be configured as or otherwise support a means for activating the first timer after transmitting the sidelink control message or sidelink measurement signal based on the configuration. The communications manager 820 may be configured as or otherwise support a means for switching from a TX mode to a RX mode based on activating the first timer. The communications manager 820 may be configured as or otherwise support a means for activating the second timer to extend the active duration of the discontinuous cycle based on expiration of the first timer. The communications manager 820 may be configured as or otherwise support a means for monitoring, after switching from the TX mode to the RX mode, for a sidelink response to the sidelink control message or sidelink measurement signal from the second UE during an extension period of the active duration based on activating the second timer and in accordance with the configuration.

Additionally or alternatively, the communications manager 820 may support wireless communications at a first UE in accordance with examples as disclosed herein. For example, the communications manager 820 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The communications manager 820 may be configured as or otherwise support a means for receiving, within the active duration of the discontinuous cycle, a sidelink control message or sidelink measurement signal from a second UE. The communications manager 820 may be configured as or otherwise support a means for activating the first timer after receiving the sidelink message or sidelink measurement signal based on the configuration. The communications manager 820 may be configured as or otherwise support a means for switching from a RX mode to a TX mode based on activating the first timer. The communications manager 820 may be configured as or otherwise support a means for activating the second timer to extend the active duration of the discontinuous cycle based on expiration of the first timer. The communications manager 820 may be configured as or otherwise support a means for transmitting, after switching from the RX mode to the TX mode, a sidelink response to the sidelink control message or sidelink measurement signal during an extension period of the active duration based on activating the second timer and in accordance with the configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for configuring one or more UEs with sidelink timers for switching communication directions for communicating a sidelink response to a sidelink message, which may reduce processing, reduce power consumption, cause more efficient utilization of communication resources, and the like.

Figure 9:
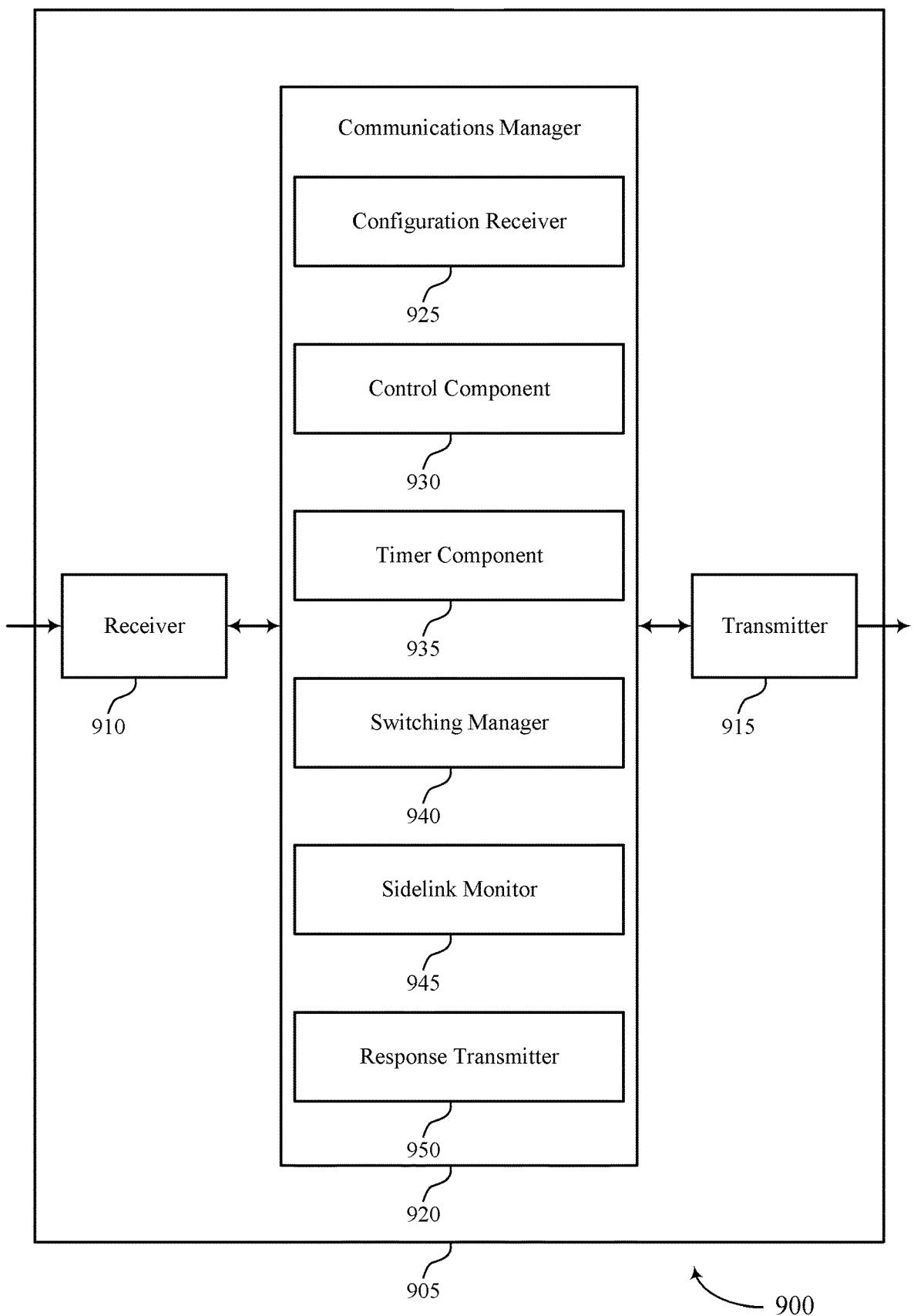

FIG. 9 shows a block diagram 900 of a device 905 that supports directional sidelink DRX and operations in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to directional sidelink DRX and operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to directional sidelink DRX and operations). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of directional sidelink DRX and operations as described herein. For example, the communications manager 920 may include a configuration receiver 925, a control component 930, a timer component 935, a switching manager 940, a sidelink monitor 945, a response transmitter 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. The configuration receiver 925 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The control component 930 may be configured as or otherwise support a means for transmitting, within the active duration of the discontinuous cycle, a sidelink control message or sidelink measurement signal to a second UE. The timer component 935 may be configured as or otherwise support a means for activating the first timer after transmitting the sidelink control message or sidelink measurement signal based on the configuration. The switching manager 940 may be configured as or otherwise support a means for switching from a TX mode to a RX mode based on activating the first timer. The timer component 935 may be configured as or otherwise support a means for activating the second timer to extend the active duration of the discontinuous cycle based on expiration of the first timer. The sidelink monitor 945 may be configured as or otherwise support a means for monitoring, after switching from the TX mode to the RX mode, for a sidelink response to the sidelink control message or sidelink measurement signal from the second UE during an extension period of the active duration based on activating the second timer and in accordance with the configuration.

Additionally or alternatively, the communications manager 920 may support wireless communications at a first UE in accordance with examples as disclosed herein. The configuration receiver 925 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The control component 930 may be configured as or otherwise support a means for receiving, within the active duration of the discontinuous cycle, a sidelink control message or sidelink measurement signal from a second UE. The timer component 935 may be configured as or otherwise support a means for activating the first timer after receiving the sidelink message or sidelink measurement signal based on the configuration. The switching manager 940 may be configured as or otherwise support a means for switching from a RX mode to a TX mode based on activating the first timer. The timer component 935 may be configured as or otherwise support a means for activating the second timer to extend the active duration of the discontinuous cycle based on expiration of the first timer. The response transmitter 950 may be configured as or otherwise support a means for transmitting, after switching from the RX mode to the TX mode, a sidelink response to the sidelink control message or sidelink measurement signal during an extension period of the active duration based on activating the second timer and in accordance with the configuration.

Figure 10:
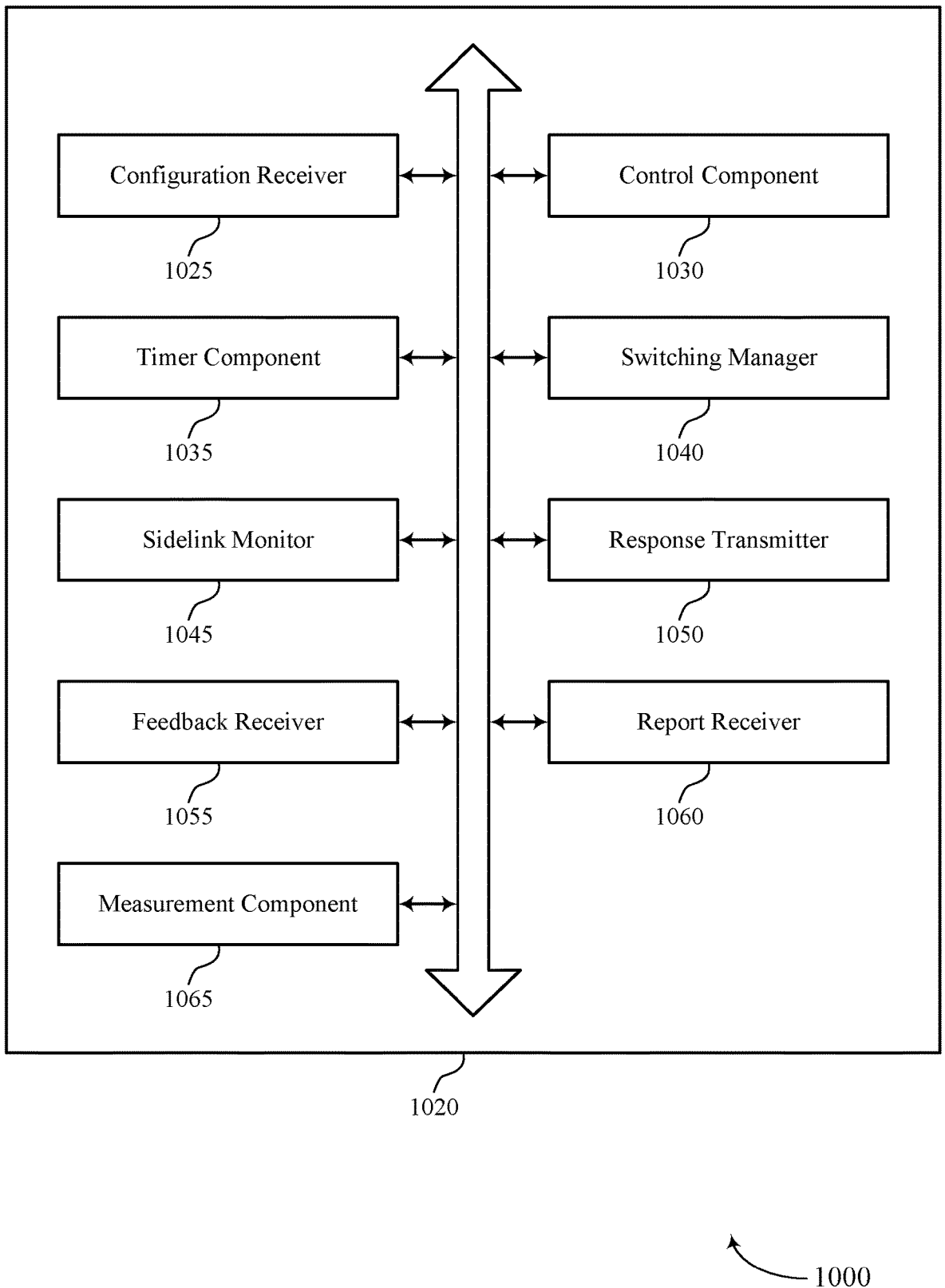
FIG. 10 shows a block diagram of a communications manager that supports directional sidelink DRX and operations in accordance with aspects of the present disclosure.

FIG. 10 shows a block diagram 1000 of a communications manager 1020 that supports directional sidelink DRX and operations in accordance with aspects of the present disclosure. The communications manager 1020 may be an example of aspects of a communications manager 820, a communications manager 920, or both, as described herein. The communications manager 1020, or various components thereof, may be an example of means for performing various aspects of directional sidelink DRX and operations as described herein. For example, the communications manager 1020 may include a configuration receiver 1025, a control component 1030, a timer component 1035, a switching manager 1040, a sidelink monitor 1045, a response transmitter 1050, a feedback receiver 1055, a report receiver 1060, a measurement component 1065, or any combination thereof. Each of these components may communicate, directly or indirectly, with one another (e.g., via one or more buses).

The communications manager 1020 may support wireless communications at a first UE in accordance with examples as disclosed herein. The configuration receiver 1025 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The control component 1030 may be configured as or otherwise support a means for transmitting, within the active duration of the discontinuous cycle, a sidelink control message or sidelink measurement signal to a second UE. The timer component 1035 may be configured as or otherwise support a means for activating the first timer after transmitting the sidelink control message or sidelink measurement signal based on the configuration. The switching manager 1040 may be configured as or otherwise support a means for switching from a TX mode to a RX mode based on activating the first timer. In some examples, the timer component 1035 may be configured as or otherwise support a means for activating the second timer to extend the active duration of the discontinuous cycle based on expiration of the first timer. The sidelink monitor 1045 may be configured as or otherwise support a means for monitoring, after switching from the TX mode to the RX mode, for a sidelink response to the sidelink control message or sidelink measurement signal from the second UE during an extension period of the active duration based on activating the second timer and in accordance with the configuration.

In some examples, the feedback receiver 1055 may be configured as or otherwise support a means for receiving, within the extension period, a feedback message indicating the sidelink control message was received successfully. In some examples, the timer component 1035 may be configured as or otherwise support a means for deactivating the second timer after receiving the feedback message.

In some examples, the feedback receiver 1055 may be configured as or otherwise support a means for receiving, within the extension period, a feedback message indicating the sidelink message was received unsuccessfully.

In some examples, the timer component 1035 may be configured as or otherwise support a means for performing a reset operation of the second timer based on unsuccessfully receiving the sidelink response.

In some examples, the timer component 1035 may be configured as or otherwise support a means for activating the first timer for switching to the TX mode for retransmission based on unsuccessfully receiving the sidelink response.

In some examples, the sidelink measurement signal includes one or more reference signals for a channel measurement, and the report receiver 1060 may be configured as or otherwise support a means for receiving, in response to the one or more reference signals and during the extension period of the active duration, a report including information corresponding to the channel measurement.

In some examples, the one or more reference signals include a channel state information reference signal and the channel measurement includes a channel state information measurement. In some examples, the sidelink control message is a MAC-CE and includes a MAC-CE timer. In some examples, the sidelink control message is a PC5 control message and includes an RRC timer or a PC5 sidelink timer.

In some examples, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

In some examples, the configuration is based on a quality of service for the sidelink communications, a packet delay budget for the sidelink communications, a reliability parameter, a priority of the control message, or a combination thereof.

Additionally or alternatively, the communications manager 1020 may support wireless communications at a first UE in accordance with examples as disclosed herein. In some examples, the configuration receiver 1025 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. In some examples, the control component 1030 may be configured as or otherwise support a means for receiving, within the active duration of the discontinuous cycle, a sidelink control message or sidelink measurement signal from a second UE. In some examples, the timer component 1035 may be configured as or otherwise support a means for activating the first timer after receiving the sidelink message or sidelink measurement signal based on the configuration. In some examples, the switching manager 1040 may be configured as or otherwise support a means for switching from a RX mode to a TX mode based on activating the first timer. In some examples, the timer component 1035 may be configured as or otherwise support a means for activating the second timer to extend the active duration of the discontinuous cycle based on expiration of the first timer. The response transmitter 1050 may be configured as or otherwise support a means for transmitting, after switching from the RX mode to the TX mode, a sidelink response to the sidelink control message or sidelink measurement signal during an extension period of the active duration based on activating the second timer and in accordance with the configuration.

In some examples, to support transmitting the sidelink response, the response transmitter 1050 may be configured as or otherwise support a means for transmitting, within the extension period, a feedback message indicating the sidelink control message was received successfully. In some examples, to support transmitting the sidelink response, the timer component 1035 may be configured as or otherwise support a means for deactivating the second timer after transmitting the feedback message.

In some examples, to support transmitting the sidelink response, the response transmitter 1050 may be configured as or otherwise support a means for transmitting, within the extension period, a feedback message indicating the sidelink message was received unsuccessfully.

In some examples, the timer component 1035 may be configured as or otherwise support a means for performing a reset operation of the second timer based on transmitting the feedback message.

In some examples, the timer component 1035 may be configured as or otherwise support a means for activating the first timer for switching to the RX mode for retransmission based on unsuccessfully receiving the sidelink control message.

In some examples, the measurement component 1065 may be configured as or otherwise support a means for receiving, within the active duration, the sidelink measurement signal, where the sidelink measurement signal includes one or more reference signals for a channel measurement. In some examples, the measurement component 1065 may be configured as or otherwise support a means for performing a set of channel measurements based on the one or more reference signals. In some examples, the measurement component 1065 may be configured as or otherwise support a means for transmitting, during the extension period of the active duration, a report including information corresponding to the set of channel measurements.

In some examples, the one or more reference signals include a channel state information reference signal and the channel measurement includes a channel state information measurement. In some examples, the sidelink control message is a PC5 control message and includes an RRC timer or a PC5 sidelink timer. In some examples, the sidelink control message is a MAC-CE and includes a MAC-CE timer.

In some examples, the sidelink control message includes a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

In some examples, the configuration is based on a quality of service for the sidelink communications, a packet delay budget for the sidelink communications, a reliability parameter, a priority of the control message, or a combination thereof.

Figure 11:
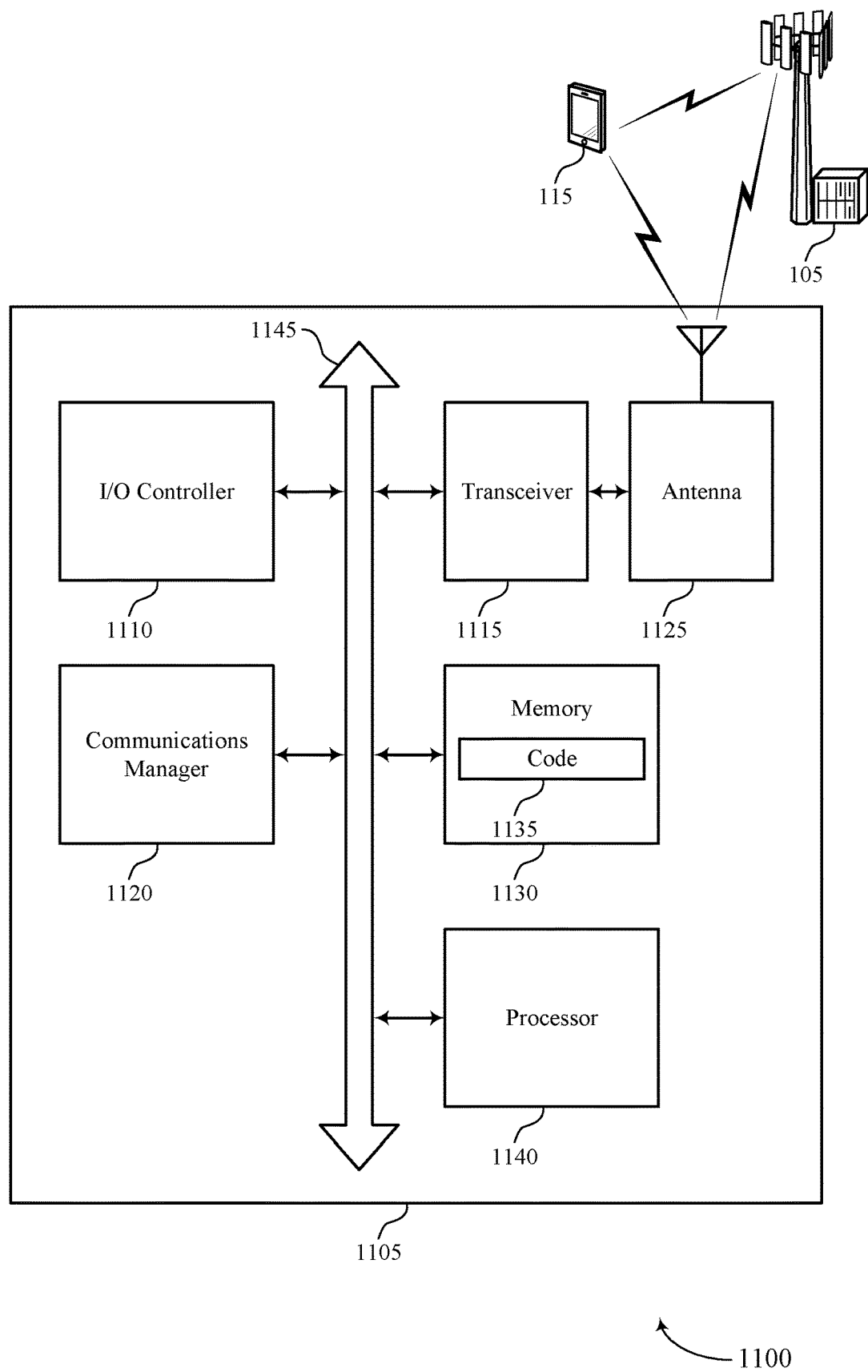
FIG. 11 shows a diagram of a system including a device that supports directional sidelink DRX and operations in accordance with aspects of the present disclosure.

FIG. 11 shows a diagram of a system 1100 including a device 1105 that supports directional sidelink DRX and operations in accordance with aspects of the present disclosure. The device 1105 may be an example of or include the components of a device 905, a device 905, or a UE 115 as described herein. The device 1005 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting directional sidelink DRX and operations). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The communications manager 1120 may be configured as or otherwise support a means for transmitting, within the active duration of the discontinuous cycle, a sidelink control message or sidelink measurement signal to a second UE. The communications manager 1120 may be configured as or otherwise support a means for activating the first timer after transmitting the sidelink control message or sidelink measurement signal based on the configuration. The communications manager 1120 may be configured as or otherwise support a means for switching from a TX mode to a RX mode based on activating the first timer. The communications manager 1120 may be configured as or otherwise support a means for activating the second timer to extend the active duration of the discontinuous cycle based on expiration of the first timer. The communications manager 1120 may be configured as or otherwise support a means for monitoring, after switching from the TX mode to the RX mode, for a sidelink response to the sidelink control message or sidelink measurement signal from the second UE during an extension period of the active duration based on activating the second timer and in accordance with the configuration.

Additionally or alternatively, the communications manager 1120 may support wireless communications at a first UE in accordance with examples as disclosed herein. For example, the communications manager 1120 may be configured as or otherwise support a means for receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The communications manager 1120 may be configured as or otherwise support a means for receiving, within the active duration of the discontinuous cycle, a sidelink control message or sidelink measurement signal from a second UE. The communications manager 1120 may be configured as or otherwise support a means for activating the first timer after receiving the sidelink message or sidelink measurement signal based on the configuration. The communications manager 1120 may be configured as or otherwise support a means for switching from a RX mode to a TX mode based on activating the first timer. The communications manager 1120 may be configured as or otherwise support a means for activating the second timer to extend the active duration of the discontinuous cycle based on expiration of the first timer. The communications manager 1120 may be configured as or otherwise support a means for transmitting, after switching from the RX mode to the TX mode, a sidelink response to the sidelink control message or sidelink measurement signal during an extension period of the active duration based on activating the second timer and in accordance with the configuration.

By including or configuring the communications manager 1120 in accordance with examples as described herein, the device 1105 may support techniques for configuring one or more UEs with sidelink timers for switching communication directions for communicating a sidelink response to a sidelink message, which may improve communication reliability, reduce latency, improve user experience related to reduced processing, reduce power consumption, cause more efficient utilization of communication resources, improve coordination between devices, increase battery life, improve utilization of processing capability, and the like.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of directional sidelink DRX and operations as described herein, or the processor 1140 and the memory 1130 may be otherwise configured to perform or support such operations. The I/O controller 1110 may be connected to the transceiver 1115 via link 1145.

Figure 12:
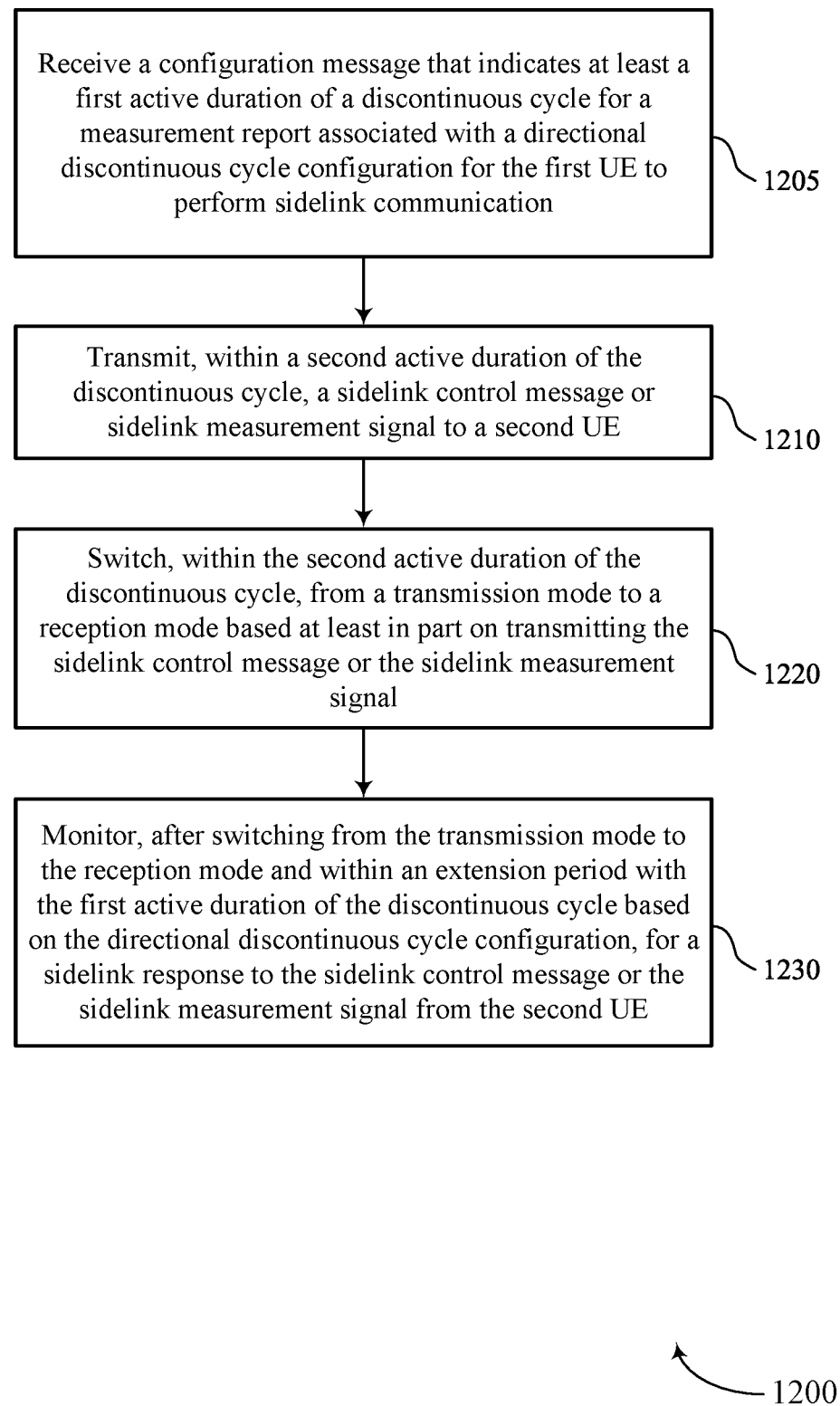
FIGS. 12 through 16 show flowcharts illustrating methods that support directional sidelink DRX and operations in accordance with aspects of the present disclosure.

FIG. 12 shows a flowchart illustrating a method 1200 that supports directional sidelink DRX and operations in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving a configuration message that indicates at least a first active duration of a discontinuous cycle for a measurement report associated with a directional discontinuous cycle configuration for the first UE to perform sidelink communication. The operations of 1205 may be performed in accordance with examples as disclosed herein. In some examples, aspects of the operations of 1205 may be performed by a configuration receiver 1025 as described with reference to FIG. 10.

At 1210, the method may include transmitting, within a second active duration of the discontinuous cycle, a sidelink control message or sidelink measurement signal to a second UE. The operations of 1210 may be performed in accordance with examples as disclosed herein. In some examples, aspects of the operations of 1210 may be performed by a control component 1030 as described with reference to FIG. 10.

At 1220, the method may include switching, within the second active duration of the discontinuous cycle, from a TX mode to a RX mode based on transmitting the sidelink control message or the sidelink measurement signal. The operations of 1220 may be performed in accordance with examples as disclosed herein. In some examples, aspects of the operations of 1220 may be performed by a switching manager 1040 as described with reference to FIG. 10.

At 1230, the method may include monitoring, after switching from the TX mode to the RX mode and within an extension period with the first active duration of the discontinuous cycle based on the directional discontinuous cycle configuration, for a sidelink response to the sidelink control message or the sidelink measurement signal from the second UE. The operations of 1230 may be performed in accordance with examples as disclosed herein. In some examples, aspects of the operations of 1230 may be performed by a sidelink monitor 1045 as described with reference to FIG. 10.

In some cases, the method may also include activating a first timer after transmitting the sidelink control message or the sidelink measurement signal based on a timer configuration for the first timer and a second timer for the first UE, the first timer for switching communication direction on sidelink and the second timer for extending the first active duration of the discontinuous cycle for sidelink communications for the first UE, where the configuration message includes the configuration, and where the switching is based on activating the first timer.

Further, the method may include activating the second timer to extend the first active duration of the discontinuous cycle based on expiration of the first timer, where the monitoring is based on activating the second timer and is in accordance with the configuration.

Figure 13:
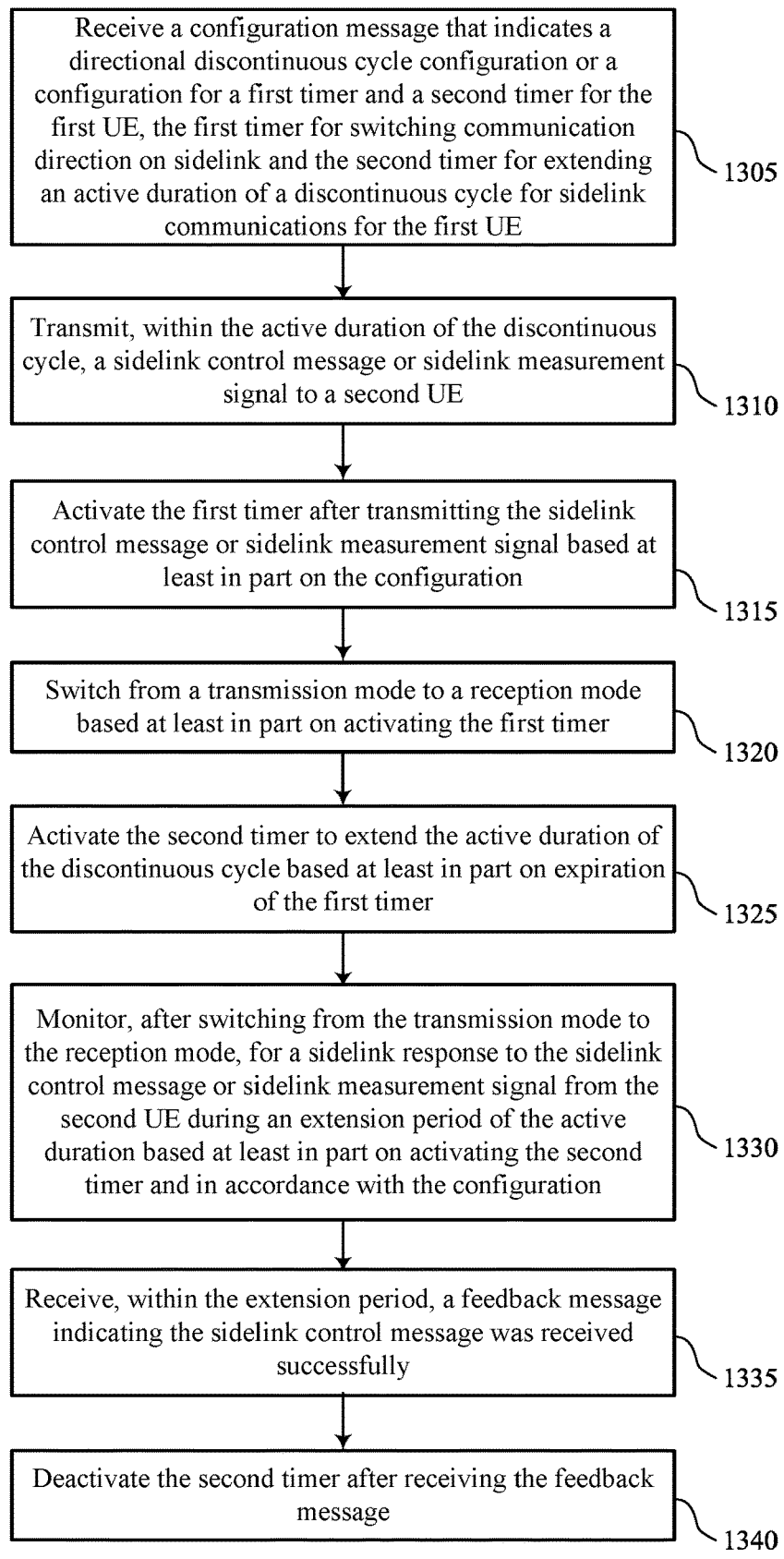

FIG. 13 shows a flowchart illustrating a method 1300 that supports directional sidelink DRX and operations in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The operations of 1305 may be performed in accordance with examples as disclosed herein. In some examples, aspects of the operations of 1305 may be performed by a configuration receiver 1025 as described with reference to FIG. 10.

At 1310, the method may include transmitting, within the active duration of the discontinuous cycle, a sidelink control message or sidelink measurement signal to a second UE. The operations of 1310 may be performed in accordance with examples as disclosed herein. In some examples, aspects of the operations of 1310 may be performed by a control component 1030 as described with reference to FIG. 10.

At 1315, the method may include activating the first timer after transmitting the sidelink control message or sidelink measurement signal based on the configuration. The operations of 1315 may be performed in accordance with examples as disclosed herein. In some examples, aspects of the operations of 1315 may be performed by a timer component 1035 as described with reference to FIG. 10.

At 1320, the method may include switching from a TX mode to a RX mode based on activating the first timer. The operations of 1320 may be performed in accordance with examples as disclosed herein. In some examples, aspects of the operations of 1320 may be performed by a switching manager 1040 as described with reference to FIG. 10.

At 1325, the method may include activating the second timer to extend the active duration of the discontinuous cycle based on expiration of the first timer. The operations of 1325 may be performed in accordance with examples as disclosed herein. In some examples, aspects of the operations of 1325 may be performed by a timer component 1035 as described with reference to FIG. 10.

At 1330, the method may include monitoring, after switching from the TX mode to the RX mode, for a sidelink response to the sidelink control message or sidelink measurement signal from the second UE during an extension period of the active duration based on activating the second timer and in accordance with the configuration. The operations of 1330 may be performed in accordance with examples as disclosed herein. In some examples, aspects of the operations of 1330 may be performed by a sidelink monitor 1045 as described with reference to FIG. 10.

At 1335, the method may include receiving, within the extension period, a feedback message indicating the sidelink control message was received successfully. The operations of 1335 may be performed in accordance with examples as disclosed herein. In some examples, aspects of the operations of 1335 may be performed by a feedback receiver 1055 as described with reference to FIG. 10.

At 1340, the method may include deactivating the second timer after receiving the feedback message. The operations of 1340 may be performed in accordance with examples as disclosed herein. In some examples, aspects of the operations of 1340 may be performed by a timer component 1035 as described with reference to FIG. 10.

Figure 14:
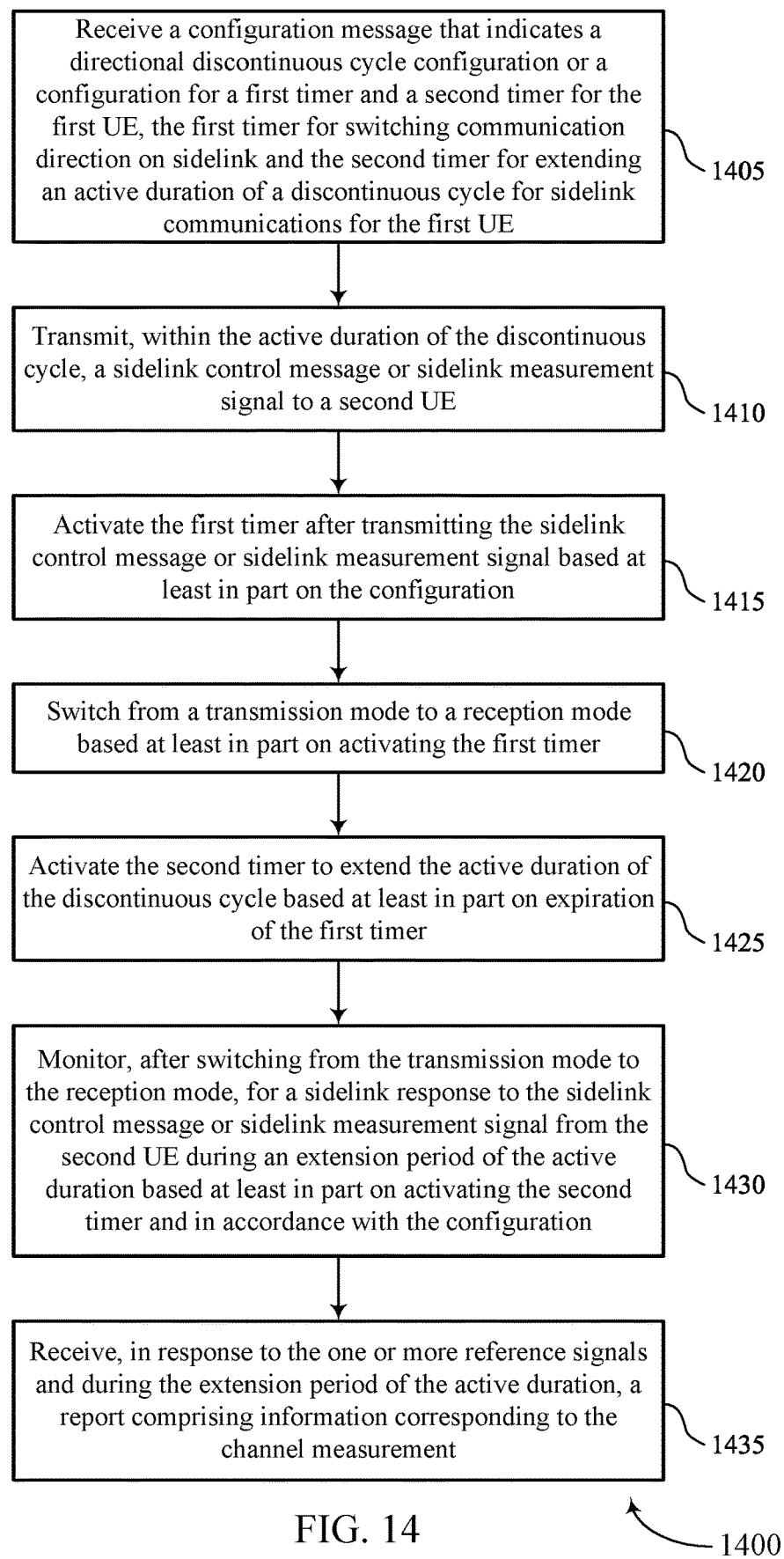

FIG. 14 shows a flowchart illustrating a method 1400 that supports directional sidelink DRX and operations in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The operations of 1405 may be performed in accordance with examples as disclosed herein. In some examples, aspects of the operations of 1405 may be performed by a configuration receiver 1025 as described with reference to FIG. 10.

At 1410, the method may include transmitting, within the active duration of the discontinuous cycle, a sidelink control message or sidelink measurement signal to a second UE. The operations of 1410 may be performed in accordance with examples as disclosed herein. In some examples, aspects of the operations of 1410 may be performed by a control component 1030 as described with reference to FIG. 10.

At 1415, the method may include activating the first timer after transmitting the sidelink control message or sidelink measurement signal based on the configuration. The operations of 1415 may be performed in accordance with examples as disclosed herein. In some examples, aspects of the operations of 1415 may be performed by a timer component 1035 as described with reference to FIG. 10.

At 1420, the method may include switching from a TX mode to a RX mode based on activating the first timer. The operations of 1420 may be performed in accordance with examples as disclosed herein. In some examples, aspects of the operations of 1420 may be performed by a switching manager 1040 as described with reference to FIG. 10.

At 1425, the method may include activating the second timer to extend the active duration of the discontinuous cycle based on expiration of the first timer. The operations of 1425 may be performed in accordance with examples as disclosed herein. In some examples, aspects of the operations of 1425 may be performed by a timer component 1035 as described with reference to FIG. 10.

At 1430, the method may include monitoring, after switching from the TX mode to the RX mode, for a sidelink response to the sidelink control message or sidelink measurement signal from the second UE during an extension period of the active duration based on activating the second timer and in accordance with the configuration. The operations of 1430 may be performed in accordance with examples as disclosed herein. In some examples, aspects of the operations of 1430 may be performed by a sidelink monitor 1045 as described with reference to FIG. 10.

At 1435, the method may include receiving, in response to the one or more reference signals and during the extension period of the active duration, a report including information corresponding to the channel measurement. The operations of 1435 may be performed in accordance with examples as disclosed herein. In some examples, aspects of the operations of 1435 may be performed by a report receiver 1060 as described with reference to FIG. 10.

Figure 15:
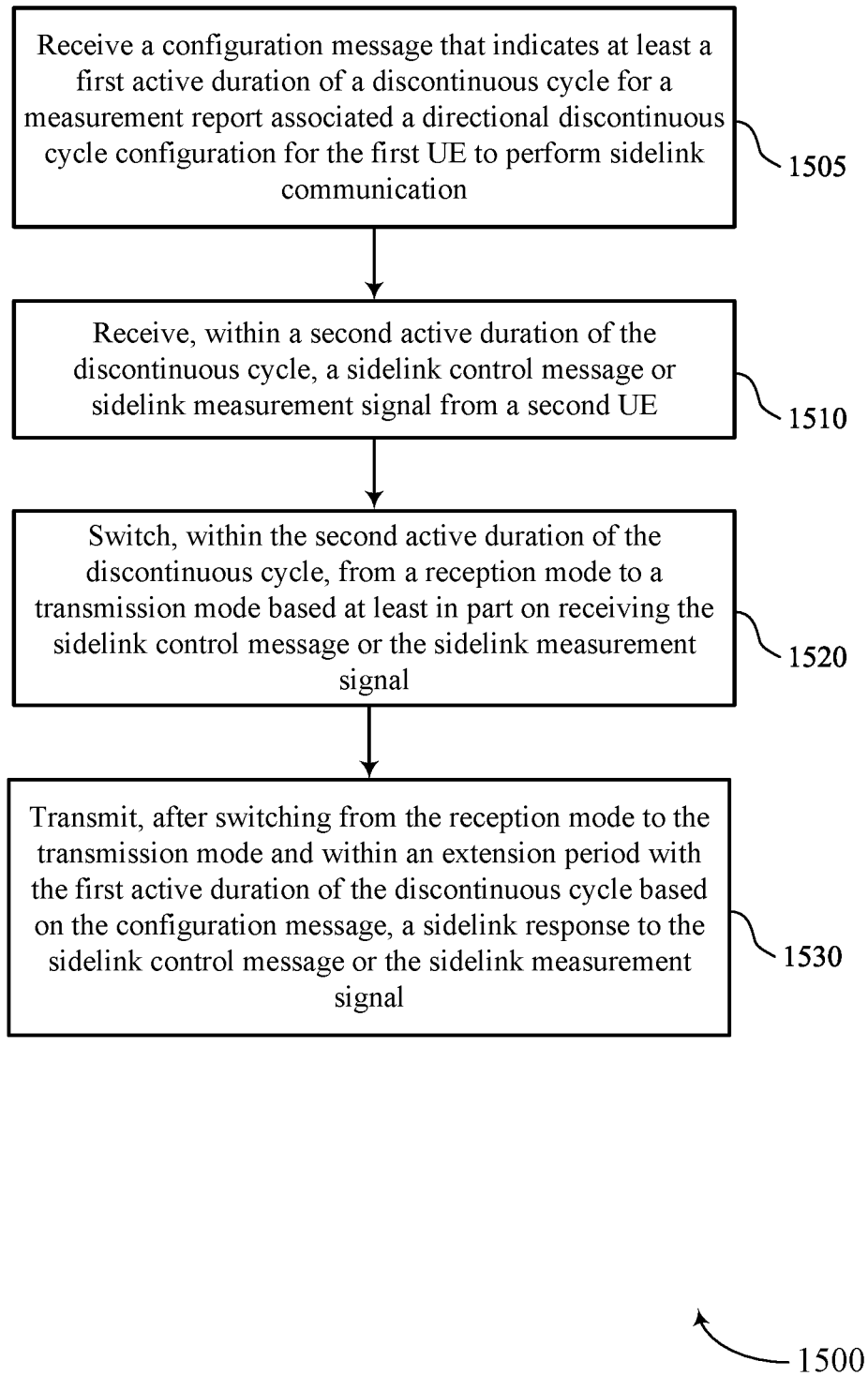

FIG. 15 shows a flowchart illustrating a method 1500 that supports directional sidelink DRX and operations in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving a configuration message that indicates at least a first active duration of a discontinuous cycle for a measurement report associated a directional discontinuous cycle configuration for the first UE to perform sidelink communication. The operations of 1505 may be performed in accordance with examples as disclosed herein. In some examples, aspects of the operations of 1505 may be performed by a configuration receiver 1025 as described with reference to FIG. 10.

At 1510, the method may include receiving, within a second active duration of the discontinuous cycle, a sidelink control message or sidelink measurement signal from a second UE. The operations of 1510 may be performed in accordance with examples as disclosed herein. In some examples, aspects of the operations of 1510 may be performed by a control component 1030 as described with reference to FIG. 10.

At 1520, the method may include switching, within the second active duration of the discontinuous cycle, from a RX mode to a TX mode based on receiving the sidelink control message or the sidelink measurement signal. The operations of 1520 may be performed in accordance with examples as disclosed herein. In some examples, aspects of the operations of 1520 may be performed by a switching manager 1040 as described with reference to FIG. 10.

At 1530, the method may include transmitting, after switching from the RX mode to the TX mode and within an extension period with the first active duration of the discontinuous cycle based on the configuration message, a sidelink response to the sidelink control message or the sidelink measurement signal. The operations of 1530 may be performed in accordance with examples as disclosed herein. In some examples, aspects of the operations of 1530 may be performed by a response transmitter 1050 as described with reference to FIG. 10.

In some cases, the method may also include activating the first timer after receiving the sidelink control message or the sidelink measurement signal based on a timer configuration for the first timer and a second timer for the first UE, the first timer for switching communication direction on sidelink and the second timer for extending the first active duration of the discontinuous cycle for sidelink communications for the first UE, where the configuration message includes the configuration, and where the switching is based on activating the first timer.

The method may further include activating the second timer to extend the first active duration of the discontinuous cycle based on expiration of the first timer, where the transmitting is based on activating the second timer and is in accordance with the configuration.

Figure 16:
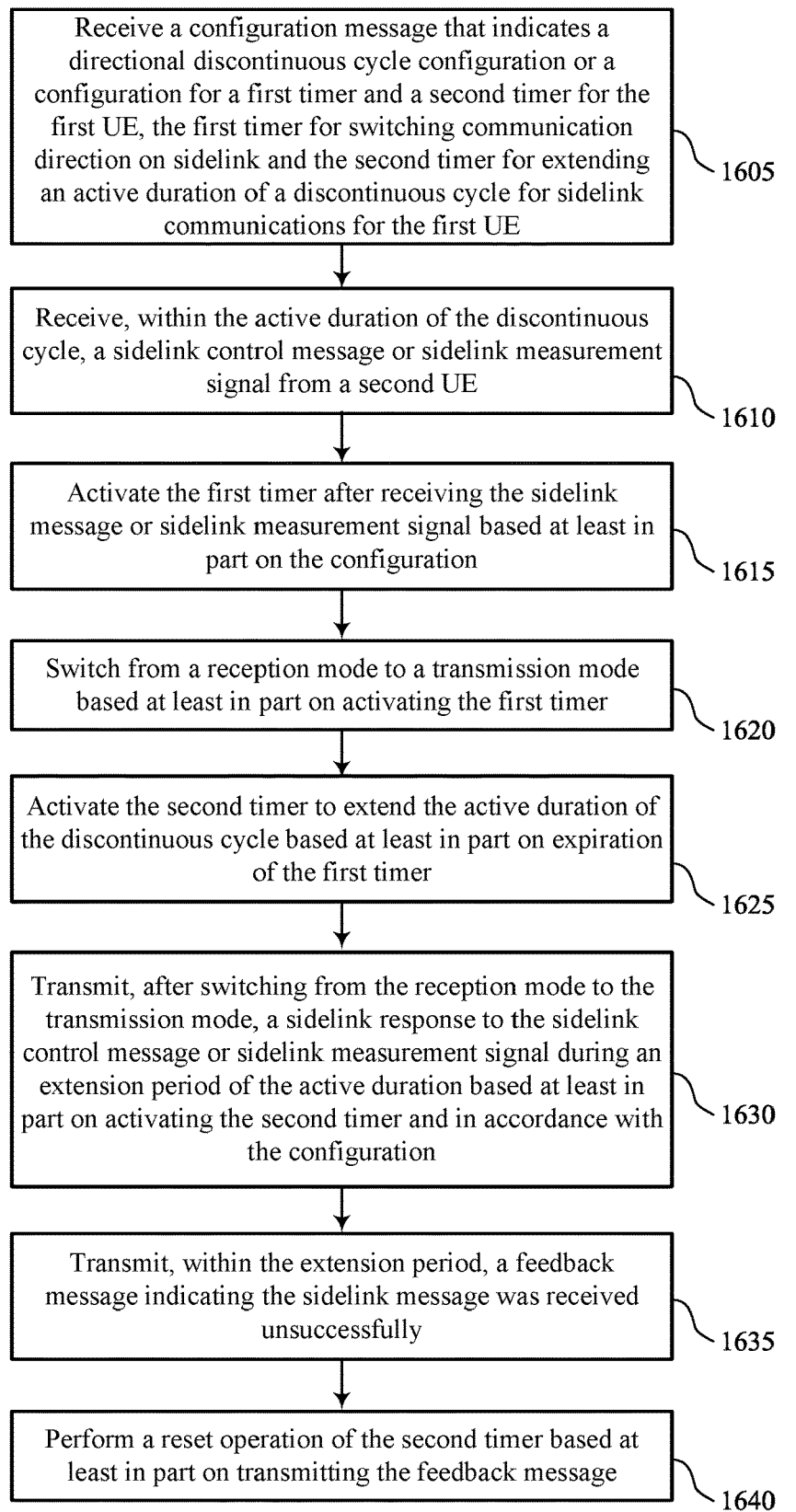

FIG. 16 shows a flowchart illustrating a method 1600 that supports directional sidelink DRX and operations in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE. The operations of 1605 may be performed in accordance with examples as disclosed herein. In some examples, aspects of the operations of 1605 may be performed by a configuration receiver 1025 as described with reference to FIG. 10.

At 1610, the method may include receiving, within the active duration of the discontinuous cycle, a sidelink control message or sidelink measurement signal from a second UE. The operations of 1610 may be performed in accordance with examples as disclosed herein. In some examples, aspects of the operations of 1610 may be performed by a control component 1030 as described with reference to FIG. 10.

At 1615, the method may include activating the first timer after receiving the sidelink message or sidelink measurement signal based on the configuration. The operations of 1615 may be performed in accordance with examples as disclosed herein. In some examples, aspects of the operations of 1615 may be performed by a timer component 1035 as described with reference to FIG. 10.

At 1620, the method may include switching from a RX mode to a TX mode based on activating the first timer. The operations of 1620 may be performed in accordance with examples as disclosed herein. In some examples, aspects of the operations of 1620 may be performed by a switching manager 1040 as described with reference to FIG. 10.

At 1625, the method may include activating the second timer to extend the active duration of the discontinuous cycle based on expiration of the first timer. The operations of 1625 may be performed in accordance with examples as disclosed herein. In some examples, aspects of the operations of 1625 may be performed by a timer component 1035 as described with reference to FIG. 10.

At 1630, the method may include transmitting, after switching from the RX mode to the TX mode, a sidelink response to the sidelink control message or sidelink measurement signal during an extension period of the active duration based on activating the second timer and in accordance with the configuration. The operations of 1630 may be performed in accordance with examples as disclosed herein. In some examples, aspects of the operations of 1630 may be performed by a response transmitter 1050 as described with reference to FIG. 10.

At 1635, the method may include transmitting, within the extension period, a feedback message indicating the sidelink message was received unsuccessfully. The operations of 1635 may be performed in accordance with examples as disclosed herein. In some examples, aspects of the operations of 1635 may be performed by a response transmitter 1050 as described with reference to FIG. 10.

At 1640, the method may include performing a reset operation of the second timer based on transmitting the feedback message. The operations of 1640 may be performed in accordance with examples as disclosed herein. In some examples, aspects of the operations of 1640 may be performed by a timer component 1035 as described with reference to FIG. 10.

The following provides an overview of aspects of the present disclosure:

Aspect 1: A method for wireless communications at a first UE, comprising: receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE; transmitting, within the active duration of the discontinuous cycle, a sidelink control message or sidelink measurement signal to a second UE; activating the first timer after transmitting the sidelink control message or sidelink measurement signal based at least in part on the configuration; switching from a transmission mode to a reception mode based at least in part on activating the first timer; activating the second timer to extend the active duration of the discontinuous cycle based at least in part on expiration of the first timer; and monitoring, after switching from the transmission mode to the reception mode, for a sidelink response to the sidelink control message or sidelink measurement signal from the second UE during an extension period of the active duration based at least in part on activating the second timer and in accordance with the configuration.

Aspect 2: The method of aspect 1, further comprising: receiving, within the extension period, a feedback message indicating the sidelink control message was received successfully; and deactivating the second timer after receiving the feedback message.

Aspect 3: The method of any of aspects 1 through 2, further comprising: receiving, within the extension period, a feedback message indicating the sidelink message was received unsuccessfully.

Aspect 4: The method of aspect 3, further comprising: performing a reset operation of the second timer based at least in part on unsuccessfully receiving the sidelink response.

Aspect 5: The method of any of aspects 3 through 4, further comprising: activating the first timer for switching to the transmission mode for retransmission based at least in part on unsuccessfully receiving the sidelink response.

Aspect 6: The method of any of aspects 1 through 5, wherein the sidelink measurement signal comprises one or more reference signals for a channel measurement, the method further comprising: receiving, in response to the one or more reference signals and during the extension period of the active duration, a report comprising information corresponding to the channel measurement.

Aspect 7: The method of aspect 6, wherein the one or more reference signals comprise a channel state information reference signal and the channel measurement comprises a channel state information measurement.

Aspect 8: The method of any of aspects 1 through 7, wherein the sidelink control message is a medium access control (MAC) control element (MAC-CE) and comprises a MAC-CE timer.

Aspect 9: The method of any of aspects 1 through 8, wherein the sidelink control message is a PC5 control message and comprises an RRC timer or a PC5 sidelink timer.

Aspect 10: The method of any of aspects 1 through 9, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

Aspect 11: The method of any of aspects 1 through 10, wherein the configuration is based at least in part on a quality of service for the sidelink communications, a packet delay budget for the sidelink communications, a reliability parameter, a priority of the control message, or a combination thereof.

Aspect 12: A method for wireless communications at a first UE, comprising: receiving a configuration message that indicates a directional discontinuous cycle configuration or a configuration for a first timer and a second timer for the first UE, the first timer for switching communication direction on sidelink and the second timer for extending an active duration of a discontinuous cycle for sidelink communications for the first UE; receiving, within the active duration of the discontinuous cycle, a sidelink control message or sidelink measurement signal from a second UE; activating the first timer after receiving the sidelink message or sidelink measurement signal based at least in part on the configuration; switching from a reception mode to a transmission mode based at least in part on activating the first timer; activating the second timer to extend the active duration of the discontinuous cycle based at least in part on expiration of the first timer; and transmitting, after switching from the reception mode to the transmission mode, a sidelink response to the sidelink control message or sidelink measurement signal during an extension period of the active duration based at least in part on activating the second timer and in accordance with the configuration.

Aspect 13: The method of aspect 12, wherein transmitting the sidelink response comprises: transmitting, within the extension period, a feedback message indicating the sidelink control message was received successfully; and deactivating the second timer after transmitting the feedback message.

Aspect 14: The method of any of aspects 12 through 13, wherein transmitting the sidelink response comprises: transmitting, within the extension period, a feedback message indicating the sidelink message was received unsuccessfully.

Aspect 15: The method of aspect 14, further comprising: performing a reset operation of the second timer based at least in part on transmitting the feedback message.

Aspect 16: The method of any of aspects 14 through 15, further comprising: activating the first timer for switching to the reception mode for retransmission based at least in part on unsuccessfully receiving the sidelink control message.

Aspect 17: The method of any of aspects 12 through 16, further comprising: receiving, within the active duration, the sidelink measurement signal, wherein the sidelink measurement signal comprises one or more reference signals for a channel measurement; performing a set of channel measurements based at least in part on the one or more reference signals; and transmitting, during the extension period of the active duration, a report comprising information corresponding to the set of channel measurements.

Aspect 18: The method of aspect 17, wherein the one or more reference signals comprise a channel state information reference signal and the channel measurement comprises a channel state information measurement.

Aspect 19: The method of any of aspects 12 through 18, wherein the sidelink control message is a PC5 control message and comprises an RRC timer or a PC5 sidelink timer.

Aspect 20: The method of any of aspects 12 through 19, wherein the sidelink control message is a medium access control (MAC) control element (MAC-CE) and comprises a MAC-CE timer.

Aspect 21: The method of any of aspects 12 through 20, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

Aspect 22: The method of any of aspects 12 through 21, wherein the configuration is based at least in part on a quality of service for the sidelink communications, a packet delay budget for the sidelink communications, a reliability parameter, a priority of the control message, or a combination thereof.

Aspect 23: An apparatus for wireless communications at a first UE, comprising a processor; memory coupled with the processor; and instructions stored in the memory and executable by the processor to cause the apparatus to perform a method of any of aspects 1 through 11.

Aspect 24: An apparatus for wireless communications at a first UE, comprising at least one means for performing a method of any of aspects 1 through 11.

Aspect 25: A non-transitory computer-readable medium storing code for wireless communications at a first UE, the code comprising instructions executable by a processor to perform a method of any of aspects 1 through 11.

Aspect 26: An apparatus for wireless communications at a first UE, comprising a processor; memory coupled with the processor; and instructions stored in the memory and executable by the processor to cause the apparatus to perform a method of any of aspects 12 through 22.

Aspect 27: An apparatus for wireless communications at a first UE, comprising at least one means for performing a method of any of aspects 12 through 22.

Aspect 28: A non-transitory computer-readable medium storing code for wireless communications at a first UE, the code comprising instructions executable by a processor to perform a method of any of aspects 12 through 22.

Aspect 29: A method for wireless communications at a first UE, comprising: receiving a configuration message that indicates at least a first active duration of a discontinuous cycle for a sidelink response associated with a configuration for the first UE to perform sidelink communication; transmitting, within a second active duration of the discontinuous cycle, a sidelink control message or sidelink measurement signal to a second UE; switching, within the second active duration of the discontinuous cycle, from a transmission mode to a reception mode based at least in part on transmitting the sidelink control message or the sidelink measurement signal; and monitoring, after switching from the transmission mode to the reception mode and within an extension period with the first active duration of the discontinuous cycle based on the configuration, for a sidelink response to the sidelink control message or the sidelink measurement signal from the second UE.

Aspect 30: The method of aspect 29, further comprising: activating a first timer after transmitting the sidelink control message or the sidelink measurement signal based at least in part on a timer configuration for the first timer and a second timer for the first UE, the first timer for switching communication direction on sidelink and the second timer for extending the first active duration of the discontinuous cycle for sidelink communications for the first UE, wherein the configuration message comprises the configuration, and wherein the switching is based at least in part on activating the first timer; and activating the second timer to extend the first active duration of the discontinuous cycle based at least in part on expiration of the first timer, wherein the monitoring is based at least in part on activating the second timer and is in accordance with the configuration.

Aspect 31: The method of aspect 30, further comprising: receiving, within the extension period, a feedback message indicating the sidelink control message was received successfully; and deactivating the second timer after receiving the feedback message.

Aspect 32: The method of aspect 30, further comprising: receiving, within the extension period, a feedback message indicating the sidelink control message was received unsuccessfully.

Aspect 33: The method of aspect 32, further comprising: performing a reset operation of the second timer based at least in part on unsuccessfully receiving the sidelink response.

Aspect 34: The method of any of aspects 32 through 33, further comprising: activating the first timer for switching to the transmission mode for retransmission based at least in part on unsuccessfully receiving the sidelink response.

Aspect 35: The method of any of aspects 29 through 34, wherein the sidelink measurement signal comprises one or more reference signals for a channel measurement and an indication for a measurement report, the method further comprising: receiving, in response to the indication for the measurement report and during the extension period of the second active duration, a report comprising information corresponding to the channel measurement.

Aspect 36: The method of aspect 35, wherein the one or more reference signals comprise a channel state information reference signal and the channel measurement comprises a channel state information measurement.

Aspect 37: The method of any of aspects 29 through 36, wherein the sidelink control message is a medium access control (MAC) control element (MAC-CE) associated with a MAC-CE timer.

Aspect 38: The method of any of aspects 29 through 36, wherein the sidelink control message is a PC5 control message associated with an RRC timer or a PC5 sidelink timer.

Aspect 39: The method of any of aspects 29 through 38, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

Aspect 40: The method of any of aspects 29 through 39, wherein the directional discontinuous cycle configuration is based at least in part on a quality of service for the sidelink communication, a packet delay budget for the sidelink communication, a reliability parameter, a priority of the sidelink control message, or a combination thereof.

Aspect 41: The method of aspect 29, further comprising: activating, after transmitting the sidelink control message or the sidelink measurement signal, a first timer based at least in part on the first active duration, wherein activating the first timer extends the second active duration of the discontinuous cycle for the switching and for the transmitting and wherein the switching is based at least in part on activating the first timer; or activating a first timer, after transmitting the sidelink control message or the sidelink measurement signal, based at least in part on a timer configuration for the first timer and a second timer for the first UE, the first timer for switching communication direction on sidelink and the second timer based at least in part on the first active duration and extending the second active duration of the discontinuous cycle, wherein the configuration message comprises the timer configuration, and wherein the switching is based at least in part on activating the first timer; and activating the second timer to extend the second active duration of the discontinuous cycle based at least in part on expiration of the first timer, wherein the monitoring is based at least in part on activating the second timer and is in accordance with the configuration.

Aspect 42: The method of aspect 41, further comprising: receiving, within the extension period, a feedback message indicating the sidelink control message was received successfully; and deactivating the second timer to end an extension period after receiving the feedback message.

Aspect 43: The method of any of aspects 41 through 42, further comprising: receiving, within an extension period, a feedback message indicating the sidelink control message was received unsuccessfully.

Aspect 44: The method of aspect 43, further comprising: deactivating the second timer to end an extension period based at least in part on unsuccessfully receiving the sidelink response.

Aspect 45: The method of any of aspects 43 through 44, further comprising: activating a timer for switching to the transmission mode for retransmission of the sidelink control message based at least in part on unsuccessfully receiving the sidelink response.

Aspect 46: The method of any of aspects 29 through 45, wherein the first active duration of a discontinuous cycle for a sidelink response is based at least in part on a quality of service parameter, including at least a latency, a reliability, or a priority, of the sidelink control message or the sidelink measurement signal, or a combination thereof.

Aspect 47: A method for wireless communications at a first UE, comprising: receiving a configuration message that indicates at least a first active duration of a discontinuous cycle for a sidelink response associated with a configuration for the first UE to perform sidelink communication; receiving, within a second active duration of the discontinuous cycle, a sidelink control message or sidelink measurement signal from a second UE; switching, within the second active duration of the discontinuous cycle, from a reception mode to a transmission mode based at least in part on receiving the sidelink control message or the sidelink measurement signal; and transmitting, after switching from the reception mode to the transmission mode and within an extension period with the first active duration of the discontinuous cycle based on the configuration message, the sidelink response to the sidelink control message or the sidelink measurement signal.

Aspect 48: The method of aspect 47, further comprising: activating a first timer after receiving the sidelink control message or the sidelink measurement signal based at least in part on a timer configuration for the first timer and a second timer for the first UE, the first timer for switching communication direction on sidelink and the second timer for extending the first active duration of the discontinuous cycle for sidelink communications for the first UE, wherein the configuration message comprises the configuration, and wherein the switching is based at least in part on activating the first timer; activating the second timer to extend the first active duration of the discontinuous cycle based at least in part on expiration of the first timer, wherein the transmitting is based at least in part on activating the second timer and is in accordance with the configuration.

Aspect 49: The method of aspect 48, wherein transmitting the sidelink response comprises: transmitting, within the extension period, a feedback message indicating the sidelink control message was received successfully; and deactivating the second timer after transmitting the feedback message.

Aspect 50: The method of aspect 48, wherein transmitting the sidelink response comprises: transmitting, within the extension period, a feedback message indicating the sidelink control message was received unsuccessfully.

Aspect 51: The method of any of aspects 47 through 50, further comprising: receiving, within the first active duration, the sidelink measurement signal, wherein the sidelink measurement signal comprises one or more reference signals for a channel measurement; performing a set of channel measurements based at least in part on the one or more reference signals; and transmitting, during the extension period of the first active duration, a report comprising information corresponding to the set of channel measurements.

Aspect 52: The method of aspect 51, wherein the one or more reference signals comprise a channel state information reference signal and the channel measurement comprises a channel state information measurement.

Aspect 53: The method of any of aspects 47 through 52, wherein the sidelink control message is a PC5 control message and comprises an RRC timer or a PC5 sidelink timer.

Aspect 54: The method of any of aspects 47 through 53, wherein the sidelink control message is a medium access control (MAC) control element (MAC-CE) and comprises a MAC-CE timer.

Aspect 55: The method of any of aspects 47 through 54, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

Aspect 56: The method of aspect 47, further comprising: activating a first timer, after transmitting the sidelink control message or the sidelink measurement signal, based at least in part on the first active duration and extending the second active duration of the discontinuous cycle, for the switching and for the transmitting, wherein the switching is based at least in part on activating the first timer; or activating the first timer after receiving the sidelink control message or the sidelink measurement signal based at least in part on a timer configuration for the first timer and a second timer for the first UE, the first timer for switching communication direction on sidelink and the second timer based at least in part on the first active duration for extending the second active duration of the discontinuous cycle for sidelink communications for the first UE, wherein the configuration message comprises the configuration, and wherein the switching is based at least in part on activating the first timer; and activating the second timer to extend the second active duration of the discontinuous cycle based at least in part on expiration of the first timer, wherein the transmitting is based at least in part on activating the second timer and is in accordance with the configuration.

Aspect 57: An apparatus for wireless communications at a first UE, comprising a processor; memory coupled with the processor; and instructions stored in the memory and executable by the processor to cause the apparatus to perform a method of any of aspects 29 through 46.

Aspect 54: An apparatus for wireless communications at a first UE, comprising at least one means for performing a method of any of aspects 29 through 46.

Aspect 55: A non-transitory computer-readable medium storing code for wireless communications at a first UE, the code comprising instructions executable by a processor to perform a method of any of aspects 29 through 46.

Aspect 56: An apparatus for wireless communications at a first UE, comprising a processor; memory coupled with the processor; and instructions stored in the memory and executable by the processor to cause the apparatus to perform a method of any of aspects 47 through 56.

Aspect 57: An apparatus for wireless communications at a first UE, comprising at least one means for performing a method of any of aspects 47 through 56.

Aspect 58: A non-transitory computer-readable medium storing code for wireless communications at a first UE, the code comprising instructions executable by a processor to perform a method of any of aspects 47 through 56.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    receiving, from a network entity, a configuration message that indicates to extend an active duration of a discontinuous cycle for a sidelink response associated with a configuration for the first UE to perform sidelink communication;
    transmitting, within an extended active duration of the discontinuous cycle, a sidelink control message or sidelink measurement signal to a second UE;
    switching, within the extended active duration of the discontinuous cycle and based at least in part on activating a first timer, from a transmission mode to a reception mode based at least in part on transmitting the sidelink control message or the sidelink measurement signal; and
    monitoring, after switching from the transmission mode to the reception mode and within the extended active duration of the discontinuous cycle based at least in part on the configuration and activating a second timer, for the sidelink response to the sidelink control message or the sidelink measurement signal from the second UE.

2. The method of claim 1, further comprising:
    activating the first timer after transmitting the sidelink control message or the sidelink measurement signal based at least in part on a timer configuration for the first timer and the second timer for the first UE, the first timer for switching communication direction on sidelink and the second timer for extending the active duration of the discontinuous cycle for sidelink communications for the first UE, wherein the configuration message comprises the configuration, and wherein the switching is based at least in part on activating the first timer; and
    activating the second timer to extend the active duration of the discontinuous cycle based at least in part on expiration of the first timer, wherein the monitoring is based at least in part on activating the second timer and is in accordance with the configuration.

3. The method of claim 1, wherein the sidelink measurement signal comprises one or more reference signals for a channel measurement and an indication for a measurement report, the method further comprising:
    receiving, in response to the indication for the measurement report and during the extended active duration, a report comprising information corresponding to the channel measurement.

4. The method of claim 1, wherein the sidelink control message is a medium access control (MAC) control element (MAC-CE) associated with a MAC-CE timer.

5. The method of claim 1, wherein the sidelink control message is a PC5 control message associated with a radio resource control (RRC) timer or a PC5 sidelink timer.

6. The method of claim 1, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

7. The method of claim 1, wherein the configuration is based at least in part on a quality of service for the sidelink communication, a packet delay budget for the sidelink communication, a reliability parameter, a priority of the sidelink control message, or a combination thereof.

8. The method of claim 1, further comprising:
    activating, after transmitting the sidelink control message or the sidelink measurement signal, the first timer based at least in part on the active duration, wherein activating the first timer further extends the active duration of the discontinuous cycle for the switching and for the transmitting, and wherein the switching is based at least in part on activating the first timer; or
    activating the first timer, after transmitting the sidelink control message or the sidelink measurement signal, based at least in part on a timer configuration for the first timer and the second timer for the first UE, the first timer for switching communication direction on sidelink and the second timer based at least in part on the active duration and extending the active duration of the discontinuous cycle, wherein the configuration message comprises the timer configuration, and wherein the switching is based at least in part on activating the first timer; and
    activating the second timer to extend the active duration of the discontinuous cycle based at least in part on expiration of the first timer, wherein the monitoring is based at least in part on activating the second timer and is in accordance with the configuration.

9. The method of claim 1, wherein the extended active duration of the discontinuous cycle for the sidelink response is based at least in part on a quality of service parameter, including at least a latency, a reliability, or a priority, of the sidelink control message or the sidelink measurement signal, or a combination thereof.

10. The method of claim 2, further comprising:
receiving, within the extended active duration, a feedback message indicating the sidelink control message was received successfully; and
deactivating the second timer after receiving the feedback message.

11. The method of claim 2, further comprising:
receiving, within the extended active duration, a feedback message indicating the sidelink control message was received unsuccessfully.

12. The method of claim 3, wherein the one or more reference signals comprise a channel state information reference signal and the channel measurement comprises a channel state information measurement.

13. The method of claim 8, further comprising:
receiving, within the extended active duration, a feedback message indicating the sidelink control message was received successfully; and
deactivating the second timer to end the extended active duration after receiving the feedback message.

14. The method of claim 8, further comprising:
receiving, within the extended active duration, a feedback message indicating the sidelink control message was received unsuccessfully.

15. The method of claim 11, further comprising:
performing a reset operation of the second timer based at least in part on unsuccessfully receiving the sidelink response.

16. The method of claim 11, further comprising:
activating the first timer for switching to the transmission mode for retransmission based at least in part on unsuccessfully receiving the sidelink response.

17. The method of claim 14, further comprising:
deactivating the second timer to end the extended active duration based at least in part on unsuccessfully receiving the sidelink response.

18. The method of claim 14, further comprising:
activating a timer for switching to the transmission mode for retransmission of the sidelink control message based at least in part on unsuccessfully receiving the sidelink response.

19. A method for wireless communications at a first user equipment (UE), comprising:
receiving, from a network entity, a configuration message that indicates to extend an active duration of a discontinuous cycle for a sidelink response associated with a configuration for the first UE to perform sidelink communication;
receiving, within the extended active duration of the discontinuous cycle, a sidelink control message or sidelink measurement signal from a second UE;
switching, within the extended active duration of the discontinuous cycle and based at least in part on activating a first timer, from a reception mode to a transmission mode based at least in part on receiving the sidelink control message or the sidelink measurement signal; and
transmitting, after switching from the reception mode to the transmission mode and within the extended active duration of the discontinuous cycle based at least in part on the configuration message and activating a second timer, the sidelink response to the sidelink control message or the sidelink measurement signal.

20. The method of claim 19, further comprising:
activating the first timer after receiving the sidelink control message or the sidelink measurement signal based at least in part on a timer configuration for the first timer and the second timer for the first UE, the first timer for switching communication direction on sidelink and the second timer for extending the active duration of the discontinuous cycle for sidelink communications for the first UE, wherein the configuration message comprises the configuration, and wherein the switching is based at least in part on activating the first timer; and
activating the second timer to extend the active duration of the discontinuous cycle based at least in part on expiration of the first timer, wherein the transmitting is based at least in part on activating the second timer and is in accordance with the configuration.

21. The method of claim 19, further comprising:
receiving, within the extended active duration, the sidelink measurement signal, wherein the sidelink measurement signal comprises one or more reference signals for a channel measurement and an indication for a measurement report;
performing a set of channel measurements based at least in part on the one or more reference signals; and
transmitting, during the extended active duration, a report comprising information based at least in part on the set of channel measurements corresponding to the indication for the measurement report.

22. The method of claim 19, wherein the sidelink control message is a PC5 control message associated with a radio resource control (RRC) timer or a PC5 sidelink timer.

23. The method of claim 19, wherein the sidelink control message is a medium access control (MAC) control element (MAC-CE) associated with a MAC-CE timer.

24. The method of claim 19, wherein the sidelink control message comprises a direct communication request, a direct communication accept, a link identifier update request, a link identifier update response, a link identifier update feedback message, a disconnect request, a disconnect response, a link modification request, a link modification accept, a feedback message, a keep-alive message, a radio resource control configuration message, or a combination thereof.

25. The method of claim 19, further comprising:
activating the first timer, after transmitting the sidelink control message or the sidelink measurement signal, based at least in part on the active duration and extending the second active duration of the discontinuous cycle, for the switching and for the transmitting, wherein the switching is based at least in part on activating the first timer; or
activating the first timer after receiving the sidelink control message or the sidelink measurement signal based at least in part on a timer configuration for the first timer and the second timer for the first UE, the first timer for switching communication direction on sidelink and the second timer based at least in part on the active duration for further extending the second active duration of the discontinuous cycle for sidelink communications for the first UE, wherein the configuration message comprises the configuration, and wherein the switching is based at least in part on activating the first timer; and
activating the second timer to extend the active duration of the discontinuous cycle based at least in part on expiration of the first timer, wherein the transmitting is based at least in part on activating the second timer and is in accordance with the configuration.

26. The method of claim 20, wherein transmitting the sidelink response comprises:
   transmitting, within the extended active duration, a feedback message indicating the sidelink control message was received successfully; and
   deactivating the second timer after transmitting the feedback message.

27. The method of claim 20, wherein transmitting the sidelink response comprises:
   transmitting, within the extended active duration, a feedback message indicating the sidelink control message was received unsuccessfully.

28. The method of claim 21, wherein the one or more reference signals comprise a channel state information reference signal and the set of channel measurements comprise channel state information measurements.

29. An apparatus for wireless communications at a first user equipment (UE), comprising:
   a processor;
   memory coupled with the processor; and
   instructions stored in the memory and executable by the processor to cause the apparatus to:
   receive, from a network entity, a configuration message that indicates to extend an active duration of a discontinuous cycle for a sidelink response associated with a configuration for the first UE to perform sidelink communication;
   transmit, within the extended active duration of the discontinuous cycle, a sidelink control message or sidelink measurement signal to a second UE;
   switch, within the extended active duration of the discontinuous cycle and based at least in part on activating a first timer, from a transmission mode to a reception mode based at least in part on transmitting the sidelink control message or the sidelink measurement signal; and
   monitor, after switching from the transmission mode to the reception mode and within the extended active duration of the discontinuous cycle based at least in part on the configuration and activating a second timer, for the sidelink response to the sidelink control message or the sidelink measurement signal from the second UE.

30. An apparatus for wireless communications at a first user equipment (UE), comprising:
   a processor;
   memory coupled with the processor; and
   instructions stored in the memory and executable by the processor to cause the apparatus to:
   receive, from a network entity, a configuration message that indicates to extend an active duration of a discontinuous cycle for a sidelink response associated with a configuration for the first UE to perform sidelink communication;
   receive, within the extended duration of the discontinuous cycle, a sidelink control message or sidelink measurement signal from a second UE;
   switch, within the extended active duration of the discontinuous cycle and based at least in part on activating a first timer, from a reception mode to a transmission mode based at least in part on receiving the sidelink control message or the sidelink measurement signal; and
   transmit after switching from the reception mode to the transmission mode and within the extended active duration of the discontinuous cycle based at least in part on the configuration message and activating a second timer, the sidelink response to the sidelink control message or the sidelink measurement signal.

* * * * *